United States Patent
Tanizaki et al.

(10) Patent No.: US 11,045,747 B2
(45) Date of Patent: Jun. 29, 2021

(54) HOLLOW FIBER MEMBRANE MODULE, DEGASSING AND GAS SUPPLYING DEVICE, INKJET PRINTER, AND DEVICE FOR MANUFACTURING CARBONATED SPRING

(71) Applicant: MITSUBISHI CHEMICAL CLEANSUI CORPORATION, Shinagawa-ku (JP)

(72) Inventors: Yoshie Tanizaki, Tokyo (JP); Hiroyuki Okazaki, Tokyo (JP); Yoshiichi Nakagawa, Tokyo (JP); Masanori Itakura, Tokyo (JP); Kaoru Terazawa, Tokyo (JP); Nobuyuki Kikuya, Tokyo (JP); Hiroyuki Tanaka, Tokyo (JP); Hideo Kumamoto, Tokyo (JP); Hiroyuki Fujiki, Tokyo (JP); Kentarou Oda, Tokyo (JP)

(73) Assignee: MITSUBISHI CHEMICAL CLEANSUI CORPORATION, Shinagawa-ku (JP)

( * ) Notice: Subject to any disclaimer, the term of this patent is extended or adjusted under 35 U.S.C. 154(b) by 207 days.

(21) Appl. No.: 16/267,426

(22) Filed: Feb. 5, 2019

(65) Prior Publication Data

US 2019/0168135 A1   Jun. 6, 2019

Related U.S. Application Data

(63) Continuation of application No. PCT/JP2017/028572, filed on Aug. 7, 2017.

(30) Foreign Application Priority Data

Aug. 17, 2016 (JP) .............................. JP2016-159840

(51) Int. Cl.
*B01D 19/00*   (2006.01)
*B01D 61/00*   (2006.01)
(Continued)

(52) U.S. Cl.
CPC ......... *B01D 19/0042* (2013.01); *B01D 19/00* (2013.01); *B01D 61/00* (2013.01);
(Continued)

(58) Field of Classification Search
None
See application file for complete search history.

(56) References Cited

U.S. PATENT DOCUMENTS 5,259,997 A * 11/1993 Kazuma ................ B01F 3/0473
  261/119.1
6,149,817 A   11/2000 Peterson et al.
(Continued)

FOREIGN PATENT DOCUMENTS

CA   2 918 931   *  1/2015   ............. B01D 19/00
CN   105517693       4/1916
(Continued)

OTHER PUBLICATIONS

Office Action dated Sep. 8, 2020 in corresponding Japanese Patent Application No. 2018-534352 (with English Translation), 6 pages.
(Continued)

*Primary Examiner* — Jason M Greene
(74) *Attorney, Agent, or Firm* — Oblon, McClelland, Maier & Neustadt, L.L.P.

(57) ABSTRACT

The present invention pertains to a hollow fiber membrane module (5) for removing gas from an objective liquid or supplying gas to the objective liquid, comprising: a hollow fiber membrane bundle (20); and a collecting member (51) configured to collect first ends (20a) of the hollow fiber membrane bundle (20) while maintaining openings of opened end portions (22a) of hollow fiber membranes (22) of the hollow fiber membrane bundle (20), wherein the collecting member (51) has a coupling portion configured to
(Continued)

couple the collecting member (51) to an installation object in a detachable and liquid-tight manner.

30 Claims, 18 Drawing Sheets

(51) Int. Cl.
| | |
|---|---|
| *B01D 69/02* | (2006.01) |
| *B01F 1/00* | (2006.01) |
| *B01F 3/04* | (2006.01) |
| *B41J 2/19* | (2006.01) |
| *B01D 69/08* | (2006.01) |
| *B01D 63/02* | (2006.01) |

(52) U.S. Cl.
CPC ........... *B01D 63/02* (2013.01); *B01D 63/022* (2013.01); *B01D 69/02* (2013.01); *B01D 69/08* (2013.01); *B01D 69/081* (2013.01); *B01F 1/00* (2013.01); *B01F 3/04* (2013.01); *B41J 2/19* (2013.01)

(56) References Cited

U.S. PATENT DOCUMENTS

| | | | |
|---|---|---|---|
| 2001/0035093 A1 | 11/2001 | Yokota | |
| 2002/0148775 A1* | 10/2002 | Watari | B01D 61/00 210/500.23 |
| 2005/0260301 A1* | 11/2005 | Ooyachi | B01F 3/04269 426/67 |
| 2006/0113235 A1* | 6/2006 | Strohm | B01D 63/022 210/232 |
| 2007/0193936 A1* | 8/2007 | Almasian | B01D 35/306 210/232 |
| 2012/0304862 A1 | 12/2012 | Taylor et al. | |
| 2013/0280767 A1 | 10/2013 | Kobayashi et al. | |
| 2016/0158670 A1 | 6/2016 | Tanizaki et al. | |
| 2018/0056665 A1 | 3/2018 | Suganuma et al. | |

FOREIGN PATENT DOCUMENTS

| | | |
|---|---|---|
| CN | 202175580 | 3/2012 |
| CN | 203451512 | 2/2014 |
| EP | 2 292 318 A1 | 3/2011 |
| EP | 3 025 775 A1 | 6/2016 |
| JP | 51-045936 U | 4/1976 |
| JP | 05-007740 | 1/1993 |
| JP | 06-226057 | 8/1994 |
| JP | 07-068103 | 3/1995 |
| JP | 2001-246232 | 9/2001 |
| JP | 2004-136272 A | 5/2005 |
| JP | 4593719 | 12/2010 |
| JP | 2014-522307 | 9/2014 |
| JP | 2016-120489 | 7/2016 |

OTHER PUBLICATIONS

International Search Report dated Sep. 12, 2017 in PCT/JP2017/028572, filed on Aug. 7, 2017 (with English Translation).

Partial Supplementary European Search Report dated Sep. 5, 2019 in Patent Application No. 17841408.2, 10 pages.

Office Action dated Sep. 10, 2019 in Japanese Patent Application No. 2018-534352, 10 pages (with unedited computer generated English translation obtained from the Global Dossier).

Japanese Office Action dated Jan. 14, 2020 in Patent Application No. 2018-534352 (with unedited computer generated English translation), 8 pages.

Extended European Search Report dated Dec. 6, 2019 in European Patent Application No. 17841408.2, 8 pages.

Office Action in corresponding Chinese Application No. 201780049756.7 dated Dec. 31, 2020. (w/English Translation).

* cited by examiner

HOLLOW FIBER MEMBRANE MODULE, DEGASSING AND GAS SUPPLYING DEVICE, INKJET PRINTER, AND DEVICE FOR MANUFACTURING CARBONATED SPRING

TECHNICAL FIELD

The present invention relates to a hollow fiber membrane module for removing gas from an objective liquid or supplying gas to an objective liquid, a degassing and gas supplying device provided with the hollow fiber membrane module, an inkjet printer provided with the degassing and gas supplying device, and a device for manufacturing a carbonated spring.

This application is a continuation application of International Application No. PCT/JP2017/028572, filed on Aug. 7, 2017, which claims the benefit of Japanese Patent Application No. 2016-159840, filed on Aug. 17, 2016, which is incorporated herein by reference in its entirety.

BACKGROUND ART

A hollow fiber membrane module is used to remove a dissolved gas from a liquid (degassing) or supply gas to liquid (gas supplying) as well as filtration of the liquid. For example, there are known a degassing device that removes dissolved oxygen from inkjet printer ink using the hollow fiber membrane module, a gas supplying device that dissolves a carbonic acid gas to raw water using the hollow fiber membrane module to produce a carbonated spring, and the like.

For example, the followings were proposed as a hollow fiber membrane module for degassing or gas supplying or a degassing and gas supplying device having the same:

(1) a fluid treatment assembly in which a hollow fiber membrane bundle formed by aligning a plurality of hollow fiber membranes has a first end fixed to a first end cap using a first tube seat and a second end fixed to a second end cap using a second tube seat, so that a plurality of shell-less fluid contactors are arranged inside a light-tight enclosing wall (see Patent Document 1);

(2) a contactor system in which a plurality of flat panel contactors provided with rectangular frames surrounding a spout attached to both ends of the hollow fiber membrane bundle formed by aligning a plurality of hollow fiber membranes are inserted into a housing (see Patent Document 2); and (3) a membrane degassing device having an objective liquid container, a plurality of hollow fiber degassing membranes housed in the objective liquid container, and a bonding portion and a partition that fix ends of the hollow fiber degassing membranes to the inside of the objective liquid container to divide the inside of the objective liquid container into an objective liquid chamber and a decompression chamber (see Patent Document 3).

CITATION LIST

Patent Document

Patent Document 1: JP 4593719 B2
Patent Document 2: JP 2014-522307 W
Patent Document 3: JP 7-68103 A

SUMMARY OF THE INVENTION

Problem to be Solved by the Invention

The fluid treatment assembly of (1) and the contactor system of (2) have the following problems.

Since both ends of the hollow fiber membrane bundle are fixed, it is difficult for an objective liquid to flow between the hollow fiber membranes and effectively use the hollow fiber membrane. For this reason, it is difficult to sufficiently remove or supply the gas from or to the objective liquid.

Since both ends of the hollow fiber membrane bundle are fixed, the hollow fiber membrane module (shell-less fluid contactor or flat panel contactor) itself has a complicated structure. For this reason, it is difficult to inexpensively provide the hollow fiber membrane module.

Since both ends of the hollow fiber membrane bundle are fixed, an installation structure for installing the hollow fiber membrane module (shell-less fluid contactor or flat panel contactor) in the casing becomes complicated. For this reason, it is difficult to effectively arrange the membrane on the objective liquid. In addition, it is difficult to easily install the hollow fiber membrane module in the casing. Furthermore, it is difficult to insert the hollow fiber membrane module in an arbitrary place in the middle of the pipe.

The membrane degassing device of (3) has the following problems.

Since a plurality of hollow fiber degassing membranes are fixed to the inside of the objective liquid container, it is necessary to replace each membrane degassing device including the objective liquid container when the hollow fiber degassing membrane is replaced. For this reason, it is difficult to inexpensively provide the hollow fiber membrane module (membrane degassing device).

Since a plurality of hollow fiber degassing membranes are fixed to the inside of the objective liquid container, it is necessary to insert the hollow fiber degassing membrane into each membrane degassing device when the hollow fiber degassing membrane is inserted into an arbitrary place in the middle of the pipe. For this reason, it is difficult to easily install the hollow fiber membrane module (membrane degassing device) in the middle of the pipe.

The invention provides a hollow fiber membrane module capable of sufficiently performing degassing or gas supplying for an objective liquid, inexpensively providing degassing or gas supplying, and easily installable in an installation object; a degassing and gas supplying device capable of sufficiently performing degassing or gas supplying for an objective liquid, inexpensively providing degassing or gas supplying, and allowing the hollow fiber membrane module to be easily detachably installed; an inkjet printer capable of sufficiently performing degassing for ink, inexpensively providing a degassing function, and allowing the hollow fiber membrane module to be easily detachably installed, and a device for manufacturing a carbonated spring capable of sufficiently performing gas supplying for raw water, inexpensively providing a gas supplying function, and allowing the hollow fiber membrane module to be easily detachably installed.

Means for Solving Problem

The invention provides the following aspects.

<1> There is provided a hollow fiber membrane module for removing gas from an objective liquid or supplying gas to the objective liquid, including: a hollow fiber membrane bundle; and a collecting member configured to collect first ends of the hollow fiber membrane bundle while maintaining openings of opened end portions of hollow fiber membranes of the hollow fiber membrane bundle, in which the collecting member has a coupling portion configured to couple the collecting member to an installation object in a detachable and liquid-tight manner.

<2> In the hollow fiber membrane module described in <1>, in which the coupling portion has an outer shape fittable to an opening of the installation object.

<3> In the hollow fiber membrane module described in <2>, in which the coupling portion has a circular cylindrical shape, and the installation object is a pipe fitting.

<4> In the hollow fiber membrane module described in any one <1> to <3>, in which the collecting member has a housing that houses first ends of the hollow fiber membrane bundle and a fixing portion that fixes the first ends of the hollow fiber membrane bundle to the housing in a liquid-tight manner while maintaining an opening of an opened end portion of the hollow fiber membrane, and a part of the housing corresponding to the coupling portion has an installation means for coupling the collecting member to the installation object in a detachable and liquid-tight manner.

<5> In the hollow fiber membrane module described in <4>, in which the installation means is a seal member.

<6> In the hollow fiber membrane module described in <4>, in which the installation means is a thread.

<7> In the hollow fiber membrane module described in any one of <1> to <6>, in which a second end of the hollow fiber membrane bundle is a free end.

<8> In the hollow fiber membrane module described in any one of <1> to <7>, in which the hollow fiber membrane bundle is bent in a U-shape, and locations of bent portions of the hollow fiber membranes of the hollow fiber membrane bundle are aligned to substantially match each other.

<9> There is provided a degassing and gas supplying device for removing gas from an objective liquid and supplying gas to the objective liquid, including: the hollow fiber membrane module described in any one of <1> to <8>; and an objective liquid piping or an objective liquid casing installed with one or more hollow fiber membrane modules, in which the collecting member of the coupling portion is coupled to the objective liquid piping or the objective liquid casing directly or by using another member in a detachable and liquid-tight manner while an exposed portion of the hollow fiber membrane bundle of the hollow fiber membrane module is inserted into the objective liquid piping or the objective liquid casing.

<10> In the degassing and gas supplying device described in <9>, in which the collecting member is coupled to the objective liquid piping or the objective liquid casing in a detachable and liquid-tight manner by fitting the coupling portion to an opening of the objective liquid piping or the objective liquid casing.

<11> In the degassing and gas supplying device described in <9> or <10>, in which the objective liquid piping is a branch pipe having an insertion opening of the hollow fiber membrane module, an objective liquid inlet, and a treatment liquid outlet.

<12> In the degassing and gas supplying device described in <11>, in which the branch pipe has a pipe fitting having at least three openings and an extension pipe coupled to one opening of the pipe fitting, at least one of a plurality of openings of the pipe fitting opening other than that where the extension pipe is coupled is an insertion opening of the hollow fiber membrane module, and a part of the exposed portion of the hollow fiber membrane bundle of the hollow fiber membrane module is placed in the inside of the extension pipe.

<13> In the degassing and gas supplying device described in <9> or <10>, in which the objective liquid casing is a container having an insertion opening of the hollow fiber membrane module and a liquid access port serving as an objective liquid inlet and a treatment liquid outlet.

<14> In the degassing and gas supplying device described in any one of <9> to <13>, in which a coupling portion in the exposed portion side of the hollow fiber membrane bundle out of coupling portions of the collecting member is coupled to the objective liquid piping or the objective liquid casing, and a coupling portion opposite to the exposed portion side of the hollow fiber membrane bundle is coupled to a gas pipe that discharges gas from the hollow fiber membrane module or supplies gas to the hollow fiber membrane module.

<15> In the degassing and gas supplying device described in <15>, in which the collecting member has a housing that houses first ends of the hollow fiber membrane bundle and a fixing portion that fixes the first ends of the hollow fiber membrane bundle to the housing in a liquid-tight manner while maintaining an opening of an opened end portion of the hollow fiber membrane, a part of the housing corresponding to the coupling portion has a first installation means for coupling the collecting member to the objective liquid piping or the objective liquid casing in a detachable and liquid-tight manner, the objective liquid piping or the objective liquid casing is provided with a second installation means corresponding to the first installation means, and the hollow fiber membrane module is installed in the objective liquid piping or the objective liquid casing in a detachable and liquid-tight manner using the first installation means and the second installation means.

<16> In the degassing and gas supplying device described in <15>, in which the first installation means is a seal member, and the second installation means is a trench mated with the seal member.

<17> In the degassing and gas supplying device described in <15>, in which the first installation means and the second installation means are threads.

<18> In the degassing and gas supplying device described in <15>, in which the first installation means and the second installation means are bayonet types.

<19> There is provided an inkjet printer, including: one or more ink cartridges; a print head configured to discharge ink; a liquid feeding pipe configured to feed the ink from the ink cartridge to the print head; the degassing and gas supplying device described in any one of <9> to <18> provided in the middle of the liquid feeding pipe; and a decompressing means coupled to the degassing and gas supplying device using a gas pipe.

<20> There is provided a device for manufacturing a carbonated spring, including: the degassing and gas supplying device described in any one of <9> to <18>; a raw water supply pipe configured to supply raw water to the degassing and gas supplying device; a carbonated spring discharge pipe configured to discharge a carbonated spring from the degassing and gas supplying device; and a carbonic acid gas supply means coupled to the degassing and gas supplying device using a gas pipe.

Effect of the Invention

The hollow fiber membrane module according to the invention can sufficiently perform degassing or gas supplying for an objective liquid, inexpensively provide degassing or gas supplying, and be easily installable in an installation object.

The degassing and gas supplying device according to the invention can sufficiently perform degassing or gas supplying for an objective liquid, inexpensively provide degassing or gas supplying, and allow the hollow fiber membrane module to be easily detachably installed.

The inkjet printer according to the invention can sufficiently perform degassing for ink, inexpensively provide a degassing function, and allow the hollow fiber membrane module to be easily detachably installed.

The device for manufacturing a carbonated spring according to the invention can sufficiently perform gas supplying for raw water, inexpensively provide a gas supplying function, and allow the hollow fiber membrane module to be easily detachably installed.

MODE(S) FOR CARRYING OUT THE INVENTION

The following terminologies apply across the entire description and claims of this specification.

A "coupling portion" refers to a portion of a hollow fiber membrane module that adjoins an installation object at all times when the hollow fiber membrane module is installed in an installation object.

A unit of a breaking strength "N/fil" refers to a strength (N) per filament of a single hollow fiber membrane (one filament).

A break strength and an elongation at break of the hollow fiber membrane are averages obtained by measuring the strength and the ductility five times when a hollow fiber membrane having a test length of 20 mm is broken by performing a tension test using a tensile strength tester under a temperature to 25° C. and a tensioning speed of 20 mm/min.

The term "to" representing a numerical range means that numerical values inserted before and after "to" are included in as an upper limit and a lower limit.

Proportions of elements in FIGS. 1 to 26 are different from actual ones for convenient description purposes.

First Embodiment of Hollow Fiber Membrane Module

Figure 1:
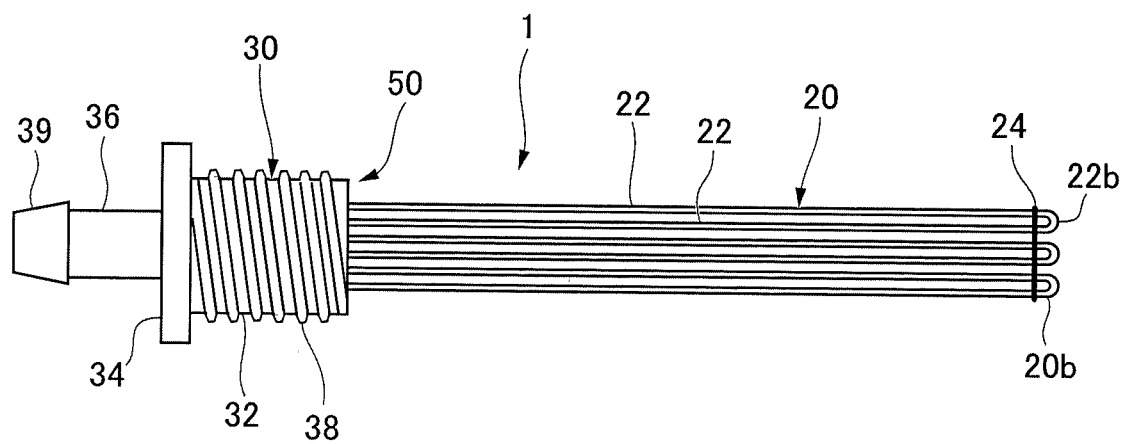
FIG. 1 is a front view illustrating a hollow fiber membrane module according to a first embodiment of the invention.
Figure 2:
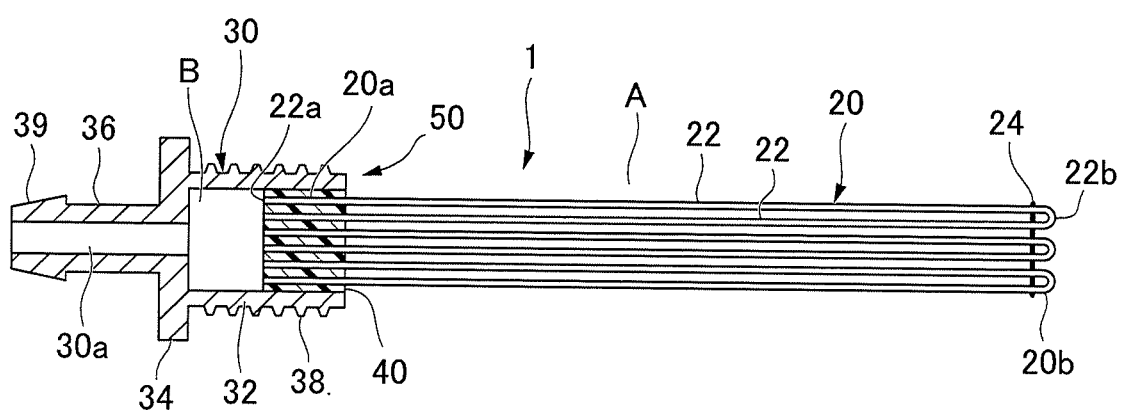
FIG. 2 is a cross-sectional view of the hollow fiber membrane module of FIG. 1.

FIG. 1 is a front view illustrating a hollow fiber membrane module according to a first embodiment of the invention. FIG. 2 is a cross-sectional view of the hollow fiber membrane module of FIG. 1.

The hollow fiber membrane module 1 has a hollow fiber membrane bundle 20 and a collecting member 50.

(Hollow Fiber Membrane Bundle)

The hollow fiber membrane bundle 20 is a cylindrical bundle including a plurality of hollow fiber membranes 22 bent in a U-shape and aligned in a length direction except for the bent portion 22b.

A first end 20a of the hollow fiber membrane bundle 20 and its vicinity are fixed to a housing 30 in an opened end portion 22a side of the hollow fiber membrane 22, and a second end 20b of the hollow fiber membrane bundle 20 is a free end in the bent portion 22b side of the hollow fiber membrane 22.

In the hollow fiber membrane bundle 20, locations of the opened end portions 22a in both ends of the hollow fiber membranes 22 are aligned to match each other.

In the hollow fiber membrane bundle 20, locations of the bent portions 22b of the hollow fiber membranes 22 are aligned to substantially match each other.

The hollow fiber membrane bundle 20 further has constraining yarn 24 extending perpendicular to a length direction of the hollow fiber membrane 22 while connecting the hollow fiber membranes 22 in the vicinity of the bent portion 22b. Note that, although the constraining yarn is provided in the hollow fiber membrane bundle in the illustrated example, the constraining yarn may not be provided in the hollow fiber membrane bundle depending on a use purpose of the hollow fiber membrane module.

An outer side of the hollow fiber membrane 22 of the hollow fiber membrane bundle 20 adjoins a first space A outside of the hollow fiber membrane module 1.

An inner side of the hollow fiber membrane 22 of the hollow fiber membrane bundle 20 communicates with a second space B inside of the housing 30.

In the hollow fiber membrane module 1, since the hollow fiber membrane 22 is exposed to the first space A, the hollow fiber membrane 22 preferably has a mechanical strength (such as a break strength and an elongation at break) such that it is not broken by a contact.

Therefore, the break strength of the hollow fiber membrane 22 is preferably set to 0.8 to 9 N/fil, and more preferably, 1 to 5 N/fil. The elongation at break of the hollow fiber membrane 22 is preferably set to 70 to 400%, and more preferably 140 to 300%.

An outer diameter of the hollow fiber membrane 22 is preferably set to 550 μm or smaller, and more preferably 300 μm or smaller in order to more effectively form a shape contactable with an objective liquid on an outer surface of the hollow fiber membrane 22. A lower limit of the outer diameter of the hollow fiber membrane 22 is not particularly limited, and is realistically set to 100 μm from the viewpoint of a mechanical strength of the hollow fiber membrane 22.

The hollow fiber membrane 22 has gas permeability in order to allow degassing or gas supplying for an objective liquid.

The hollow fiber membrane 22 may include a hydrophobic porous membrane, a composite hollow fiber membrane having a homogeneous layer and a porous layer, or the like. From the viewpoint of excellent degassing performance and gas supplying performance, the composite hollow fiber membrane is preferable, and a three-layered composite hollow fiber membrane in which porous layers interpose the homogeneous layer on both sides is more preferable.

The hollow fiber membrane 22 may be formed of polyolefin (such as polyethylene, polypropylene, and poly(4-methylpentene-1)), fluorine-based resin (such as polytetrafluoroethylene, polyvinylidene fluoride, and ethylene tetrafluoroethylene copolymer), polystyrene-based resin, polysulfone resin, polyether ketone, polyether ether ketone, polycarbonate, cellulose derivative, polyamide, polyester, polymethacrylate, polyacrylate, resin containing at least one of them, or the like. In addition, a copolymer such a resin or a material partially containing a substituent group of them may also be possible. From the viewpoint of chemical resistance or consideration to an environmental burden, polyolefin is preferable, and polyethylene and polypropylene are particularly preferable from the viewpoint of handleability in forming the fixing portion and low elution into the objective liquid.

The constraining yarn 24 includes, for example a yarn of a chain stitch (chain knitting) or the like. The constraining yarn 24 is a weaving warp provided in both sides of a Raschel knitted fabric in manufacturing of a Raschel knitted fabric serving as a hollow fiber membrane sheet as a precursor of the hollow fiber membrane bundle 20 in a manufacturing method of the hollow fiber membrane module 1 described below in order to suppress a displacement of the hollow fiber membrane 22 that are the warps in the Raschel knitted fabric.

The constraining yarn 24 may include multifilament yarn or spun yarn formed of synthetic fiber having water resistance, such as polyester fiber. As a material of the constraining yarn 24, an arbitrary material is selected depending on a user purpose of the hollow fiber membrane module 1.

(Collecting Member)

The collecting member 50 has a housing 30 and a fixing portion 40.

(Housing)

The housing 30 is a member for housing only the first end 20a and its vicinity of the hollow fiber membrane bundle 20 where the opened end portions 22a of both ends of the hollow fiber membranes 22 are aligned.

The housing 30 has a bottomed cylindrical housing body 32 (coupling portion) opened in a side where the first end 20a of the hollow fiber membrane bundle 20 is inserted, a flange portion 34 (coupling portion) extending from a bottom portion of the housing body 32 to a lateral side, and a gas access nozzle 36 (coupling portion) extending axially from the bottom portion of the housing body 32.

A second space B communicating with the inside of the hollow fiber membrane 22 is formed in the housing body 32. A thread 38 (installation means) is formed on an outer peripheral surface of the housing body 32. The thread 38 is an installation means for coupling the collecting member 50 to an installation object in a detachable and liquid-tight manner.

A gas access port 30a communicating with the second space B of the housing body 32 is formed in the gas access nozzle 36. A hose fitting 39 (installation means) for coupling a gas pipe (not illustrated) or the like is formed in a tip of the gas access nozzle 36.

The housing 30 may be formed of a material having a mechanical strength and durability, such as polycarbonate, polysulfone, polyolefin, polyvinyl chloride, acrylic resin, ABS resin, and modified polyphenylene ether.

(Fixing Portion)

The fixing portion 40 is used to fix only the first end 20a and its vicinity of the hollow fiber membrane bundle 20 to the housing body 32 of the housing 30 in a liquid-tight manner while maintaining the opening of the opened end portion 22a of the hollow fiber membrane 22 and partition the first space A (primary side) in the outer side of the hollow fiber membrane 22 and the second space B (secondary side) communicating with the inside of the hollow fiber membrane 22.

The fixing portion 40 fixes only the opened end portion 22a and its vicinity of the hollow fiber membrane bundle 20 to the opening of the housing body 32 and its vicinity such that the opened end portion 22a of the hollow fiber membrane 22 is inserted from the opening of the housing body 32, and a part except for the opened end portion 22a and its vicinity of the hollow fiber membrane 22 is placed outside the housing 30.

The first space A communicates with an objective liquid inlet and a treatment liquid outlet in a degassing and gas supplying device described below to form a flow passage of the objective liquid. There is the hollow fiber membrane bundle 20 in the first space A, and the objective liquid makes contact with the hollow fiber membrane 22 in the first space A.

The second space B is a space surrounded by the housing body 32 and the fixing portion 40. The second space B communicates with the gas access port 30a to form a flow passage of the gas.

A potting material serving as a material of the fixing portion 40 includes thermosetting resin (such as polyurethane, epoxy resin, silicon-based resin, and unsaturated polyester resin), or thermoplastic resin (such as polyolefin or fluorine-based resin).

(Method of Manufacturing Hollow Fiber Membrane Module)

The hollow fiber membrane module 1 according to the first embodiment may be manufactured, for example, in the following sequence. However, the method of manufacturing the hollow fiber membrane module according to the invention is not limited thereto.

- A hollow fiber membrane sheet of Raschel knitted fabrics is manufactured by connecting warped portions in both sides to warps of chain stitches while warping the hollow fiber membrane 22 as a weft at a predetermined length using a Raschel knitting machine.
- One warped end of the hollow fiber membrane sheet wound in a substantially cylindrical shape such that the bent portion of the hollow fiber membrane 22 becomes an end face is inserted into a cylindrical member serving as a part of the housing body 32.
- The fixing portion 40 is formed by supplying a liquid-phase potting material into the inside of the cylindrical member and hardening or solidifying it.
- The opened end portion 22a of the hollow fiber membrane 22 is formed by cutting an end of the fixing portion 40 at each warped end of the hollow fiber membrane sheet.
- The hollow fiber membrane module 1 is obtained by bonding an integrated member of a bottom portion of the housing body 32, the flange portion 34, and the gas access nozzle 36 to the cylindrical member.

(Action Mechanism)

In the hollow fiber membrane module 1 according to the first embodiment described above, it is possible to sufficiently perform degassing or gas supplying for the objective liquid for the following reasons.

(i) Since only the first end 20a and its vicinity of the hollow fiber membrane bundle 20 are fixed to the housing 30, and the second end 20b is a free end, the objective liquid easily flows through the hollow fiber membrane 22, so that it is possible to effectively use the hollow fiber membrane 22. For this reason, the hollow fiber membrane module 1 can sufficiently perform degassing or gas supplying for the objective liquid.

The hollow fiber membrane module 1 according to the first embodiment described above can be provided inexpensively for the following reasons.

(ii) Since only the first end 20a and its vicinity of the hollow fiber membrane bundle 20 are fixed to the housing 30, a structure of the hollow fiber membrane module 1 itself is simple, compared to a hollow fiber membrane module in which both ends of the hollow fiber membrane bundle are fixed.

(iii) Since the housing 30 is provided with the thread 38 (installation means) or the hose fitting 39 (installation means) for coupling the collecting member 50 to the installation object (such as an objective liquid piping, an objective liquid casing, or a gas pipe of the degassing and gas supplying device) in a detachable and liquid-tight manner, it is not necessary to replace the hollow fiber membrane bundle 20 for each degassing and gas supplying device including the objective liquid piping or objective liquid casing when the hollow fiber membrane bundle 20 is replaced.

(iv) It is possible to provide the hollow fiber membrane module 1 inexpensively due to the reasons (ii) and (iii).

In the hollow fiber membrane module 1 according to the first embodiment described above, it is possible to easily install the hollow fiber membrane module 1 in the installation object (such as the objective liquid piping, the objective liquid casing, or the gas pipe of the degassing and gas supplying device) for the following reasons.

(v) Since only the first end 20a and its vicinity of the hollow fiber membrane bundle 20 are fixed to the housing 30, and the second end 20b is a free end, an installation structure of the hollow fiber membrane module 1 for installation in the installation object becomes simple, compared to the hollow fiber membrane module in which both ends of the hollow fiber membrane bundle are fixed.

(vi) In addition to the reason (v), the housing 30 is provided with the thread 38 (installation means) or the hose fitting 39 (installation means) for coupling the collecting member 50 to the installation object in a detachable and liquid-tight manner.

(vii) It is possible to easily install the hollow fiber membrane module 1 in the installation object due to the reasons (v) and (vi).

In the hollow fiber membrane module 1 according to the first embodiment described above, the hollow fiber membranes 22 of the hollow fiber membrane bundle 20 are bent in a U-shape. Therefore, it is not necessary to fix the second end 20b of the hollow fiber membrane bundle 20 to the fixing portion. For this reason, the second end 20b of the hollow fiber membrane bundle 20 is opened, so that the gas remaining between the hollow fiber membranes 22 can easily pass, and it is possible to uniformly flow the objective liquid between the hollow fiber membranes 22. For this reason, it is possible to more sufficiently perform degassing or gas supplying for the objective liquid.

Since the hollow fiber membranes 22 are bent in a U-shape, it is possible to secure a desired density of the hollow fiber membranes 22 using a small number of hollow fiber membranes 22. For this reason, it is possible to improve manufacturing efficiency of the hollow fiber membrane module 1.

Since the hollow fiber membrane 22 is bent in a U-shape, it is possible to hold a self-sustaining state and suppress excessive scattering of the hollow fiber membrane bundle 20. For this reason, the objective liquid easily spreads over the entire hollow fiber membrane bundle 20, so that it is possible to more sufficiently perform degassing or gas supplying for the objective liquid.

In the hollow fiber membrane module 1 according to the first embodiment described above, locations of the bent portions 22b of the hollow fiber membrane bundle 20 are aligned to substantially match each other. Therefore, it becomes difficult for the objective liquid to flow locally deviatingly, so that it is possible to suppress scattering of the hollow fiber membrane bundle 20. Therefore, the objective liquid easily spreads over the entire hollow fiber membrane bundle 20, so that it is possible to more sufficiently perform degassing or gas supplying for the objective liquid.

In the hollow fiber membrane module 1 according to the first embodiment described above, the hollow fiber membrane bundle 20 has the constraining yarn 24 extending perpendicularly to the length direction of the hollow fiber membrane 22 while connecting the hollow fiber membranes 22. Therefore, it is possible to reliably hold the self-sustaining state of the hollow fiber membrane bundle 20 and suitably suppress excessive scattering of the hollow fiber membrane bundle 20. In a case where viscosity of the objective liquid is high, the hollow fiber membranes 22 tend to scatter significantly. Therefore, the constraining yarn 24 is particularly effective when the viscosity of the objective liquid is high.

Second Embodiment of Hollow Fiber Membrane Module

Figure 3:
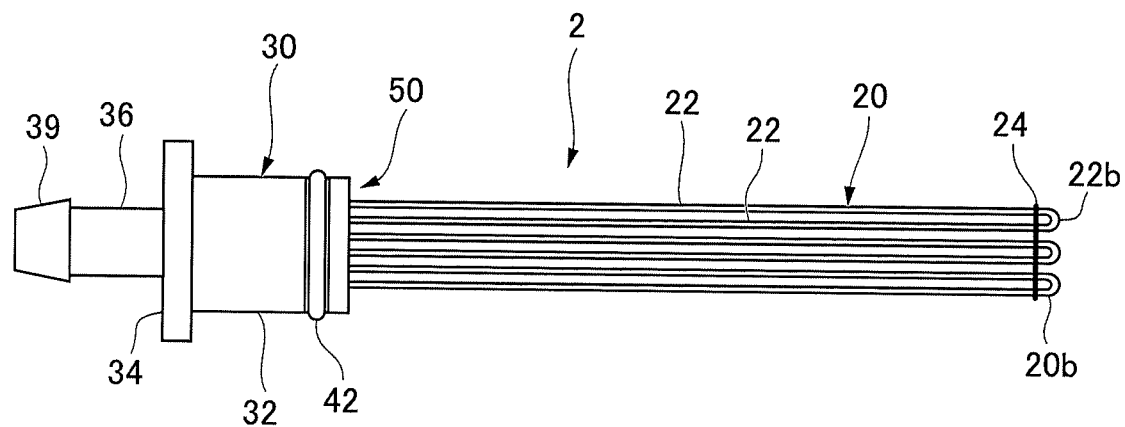
FIG. 3 is a front view illustrating a hollow fiber membrane module according to a second embodiment of the invention.

FIG. 3 is a front view illustrating a hollow fiber membrane module according to a second embodiment of the invention.

The hollow fiber membrane module 2 according to the second embodiment is different from the hollow fiber membrane module 1 of the first embodiment in the following reasons.

The housing 30 is provided with an O-ring 42 (seal member) along a peripheral direction on the outer peripheral surface of the housing body 32 instead of the thread 38 as an installation means.

In the following description, like reference numerals denote like elements as in the first embodiment, and they will not be described repeatedly.

(O-Ring)

The O-ring 42 is an installation means for coupling the collecting member 50 to the installation object in a detachable and liquid-tight manner.

The O-ring 42 may be formed of nitrile rubber, styrene butadiene rubber, silicon rubber, fluororubber, chloroprene rubber, ethylene propylene rubber, butyl rubber, elastomer such as perfluoroelastomer, or the like.

(Method of Manufacturing Hollow Fiber Membrane Module)

The hollow fiber membrane module 2 according to the second embodiment can be manufactured in a similar way to that of the hollow fiber membrane module 1 of the first embodiment.

(Action Mechanism)

The hollow fiber membrane module 2 according to the second embodiment described above can exhibit the same effects as those of the hollow fiber membrane module 1 of the first embodiment on the basis of the action mechanism similar to that of the hollow fiber membrane module 1 of the first embodiment.

Third Embodiment of Hollow Fiber Membrane Module

Figure 4:
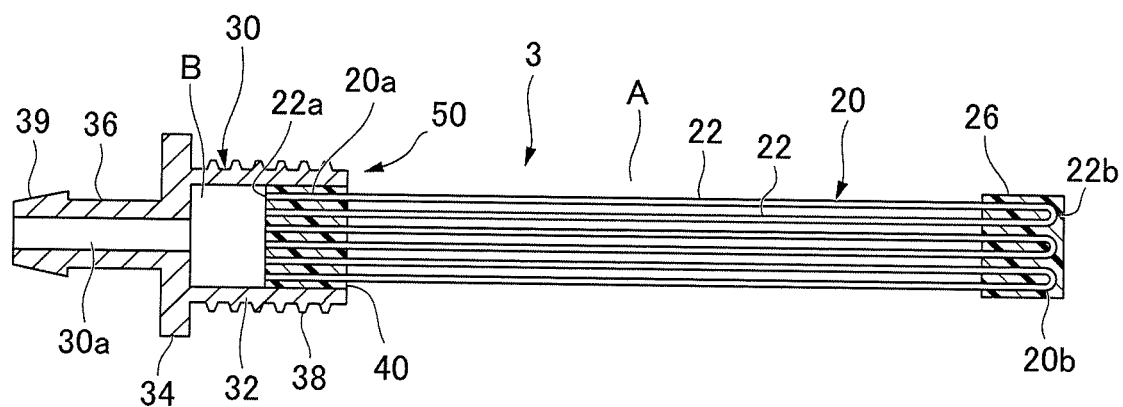
FIG. 4 is a cross-sectional view illustrating a hollow fiber membrane module according to a third embodiment of the invention.

FIG. 4 is a cross-sectional view illustrating a hollow fiber membrane module according to a third embodiment of the invention.

The hollow fiber membrane module 3 according to the third embodiment is different from the hollow fiber membrane module 1 of the first embodiment in the following reasons.

The hollow fiber membrane bundle 20 further has a constraining resin 26 that collects the hollow fiber membrane 22 in the bent portion 22b and its vicinity instead of the constraining yarn 24.

In the following description, like reference numerals denote like elements as in the first embodiment, and they will not be described repeatedly.

(Constraining Resin)

The constraining resin 26 collects only the second end 20b and its vicinity of the hollow fiber membrane bundle 20 and exhibits the effect similar to that of the constraining yarn 24 of the hollow fiber membrane module 1 of the first embodiment.

A potting material as a material of the constraining resin 26 includes, for example, thermosetting resin (such as polyurethane, epoxy resin, silicon-based resin, and unsaturated polyester resin), thermoplastic resin (such as polyolefin and fluorine-based resin).

(Action Mechanism)

The hollow fiber membrane module 3 according to the third embodiment described above can exhibit the same effects as those of the hollow fiber membrane module 1 of the first embodiment on the basis of the action mechanism similar to that of the hollow fiber membrane module 1 of the first embodiment.

Fourth Embodiment of Hollow Fiber Membrane Module

Figure 5:
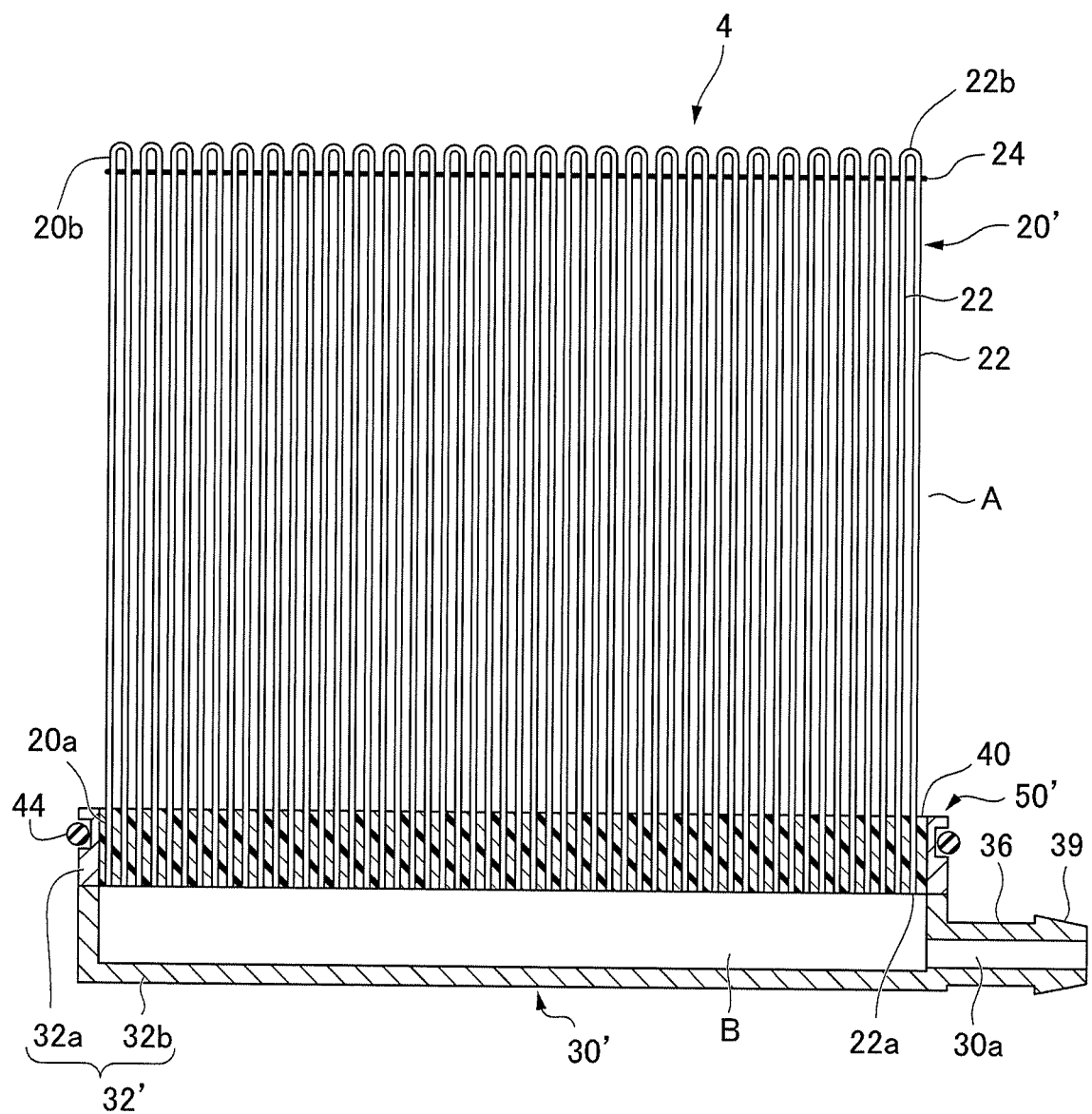
FIG. 5 is a cross-sectional view illustrating a hollow fiber membrane module according to a fourth embodiment of the invention.

FIG. 5 is a cross-sectional view illustrating a hollow fiber membrane module according to a fourth embodiment of the invention.

The hollow fiber membrane module 4 has a hollow fiber membrane bundle 20' and a collecting member 50'.

In the following description, like reference numerals denote like elements as in the first embodiment, and they will not be described repeatedly.

(Hollow Fiber Membrane Bundle)

The hollow fiber membrane bundle 20' is a sheet-like bundle including a plurality of hollow fiber membranes 22 bent in a U-shape such that their length directions are aligned except for the bent portion 22b.

In the hollow fiber membrane bundle 20', the first end 20a and its vicinity of the hollow fiber membrane bundle 20' in the opened end portion 22a side of the hollow fiber membrane 22 are fixed to the housing 30', and the second end 20b of the hollow fiber membrane bundle 20' in the bent portion 22b side of the hollow fiber membrane 22 is a free end.

In the hollow fiber membrane bundle 20', locations of the opened end portions 22a of both ends of the hollow fiber membrane 22 are aligned to match each other.

In the hollow fiber membrane bundle 20', locations of the bent portions 22b of the hollow fiber membranes 22 are aligned to substantially match each other.

The hollow fiber membrane bundle 20' further has constraining yarn 24 extending perpendicular to a length direction of the hollow fiber membrane 22 while connecting the hollow fiber membranes 22 in the vicinity of the bent portion 22b. Note that, although the constraining yarn is provided in the hollow fiber membrane bundle in the illustrated example, the constraining yarn may not be provided in the hollow fiber membrane bundle depending on a use purpose of the hollow fiber membrane module.

(Collecting Member)

The collecting member 50' has a housing 30' and a fixing portion 40'.

(Housing)

The housing 30' is a member for housing only the first end 20a and its vicinity of the hollow fiber membrane bundle 20' where the opened end portions 22a of both ends of the hollow fiber membrane 22 are aligned.

The housing 30' has a long rectangular tubular housing body 32' (coupling portion) in which a side wall where the first end 20a of the hollow fiber membrane bundle 20' is inserted is opened in a slit shape, and both end faces are enclosed, and a gas access nozzle 36 (coupling portion) extending axially from one end face of the housing 32'.

The housing body 32' is provided with a second space B communicating with the inside of the hollow fiber membrane 22. A pair of side walls parallel in the length direction of the hollow fiber membrane 22 of the hollow fiber membrane bundle 20' and both end faces are provided with a frame-shaped seal member 44 (installation means). The seal member 44 is an installation means for coupling the collecting member 50' to the installation object in a detachable and liquid-tight manner. The seal member 44 may be formed of the same material as that of the O-ring 42.

The gas access nozzle 36 is provided with a gas access port 30a communicating with the second space B of the housing body 32'. A hose fitting 39 (installation means) for coupling a gas pipe (not illustrated) or the like is formed in a tip of the gas access nozzle 36.

(Fixing Portion)

The fixing portion 40 is used to fix only the first end 20a and its vicinity of the hollow fiber membrane bundle 20' to the housing body 32 of the housing 30' in a liquid-tight manner while maintaining the opening of the opened end portion 22a of the hollow fiber membrane 22 and partition the first space A (primary side) in the outer side of the hollow fiber membrane 22 and the second space B (secondary side) communicating with the inside of the hollow fiber membrane 22.

The fixing portion 40 fixes only the opened end portion 22a and its vicinity of the hollow fiber membrane bundle 20' to the opening of the housing body 32' and its vicinity such that the opened end portion 22a of the hollow fiber membrane 22 is inserted from the slit-shaped opening of the housing body 32', and a part except for the opened end portion 22a and its vicinity of the hollow fiber membrane 22 is located outside the housing 30'.

The first space A communicates with an objective liquid inlet and a treatment liquid outlet in a degassing and gas supplying device described below to form a flow passage of the objective liquid. There is the hollow fiber membrane bundle 20' in the first space A, and the objective liquid makes contact with the hollow fiber membrane 22 in the first space A.

The second space B is a space surrounded by the housing body 32' and the fixing portion 40. The second space B communicates with the gas access port 30a to form a flow passage of the gas.

(Method of Manufacturing Hollow Fiber Membrane Module)

The hollow fiber membrane module 4 according to the fourth embodiment may be manufactured, for example, in the following sequence. However, the method of manufacturing the hollow fiber membrane module according to the invention is not limited thereto.

A hollow fiber membrane sheet of Raschel knitted fabrics is manufactured by connecting warped portions in both sides to warps of chain stitches while warping the hollow fiber membrane 22 as a weft at a predetermined length using a Raschel knitting machine.

The hollow fiber membrane sheet is inserted into a slit-like opening of a rectangular tubular housing body upper part 32a having upper and lower surfaces opened in a slit shape such that the length direction of the hollow fiber membrane 22 is perpendicular to an axial direction of the housing body upper part 32a.

The fixing portion 40 is formed by inserting the housing body upper part 32a into a resin containing vessel (not illustrated), supplying a liquid-phase potting material to the slit-like opening and its vicinity of the housing body upper part 32a, and hardening or solidifying it.

The opened end portion 22a of the hollow fiber membrane 22 is formed by removing the resin containing vessel and cutting a lower part of the fixing portion 40 of the housing body upper part 32a for each warped end of the hollow fiber membrane sheet.

The hollow fiber membrane module 4 is obtained by bonding the housing body lower part 32b provided with the gas access nozzle 36 to the end face of the housing body upper part 32a to form a housing body 32' and installing the seal member 44 in the housing body 32' to form a housing 30'.

(Action Mechanism)

In the hollow fiber membrane module 4 according to the fourth embodiment described above, it is possible to exhibit the same effects as those of the hollow fiber membrane module 1 of the first embodiment due to the action mechanism similar to that of the hollow fiber membrane module 1 of the first embodiment.

Fifth Embodiment of Hollow Fiber Membrane Module

Figure 6:
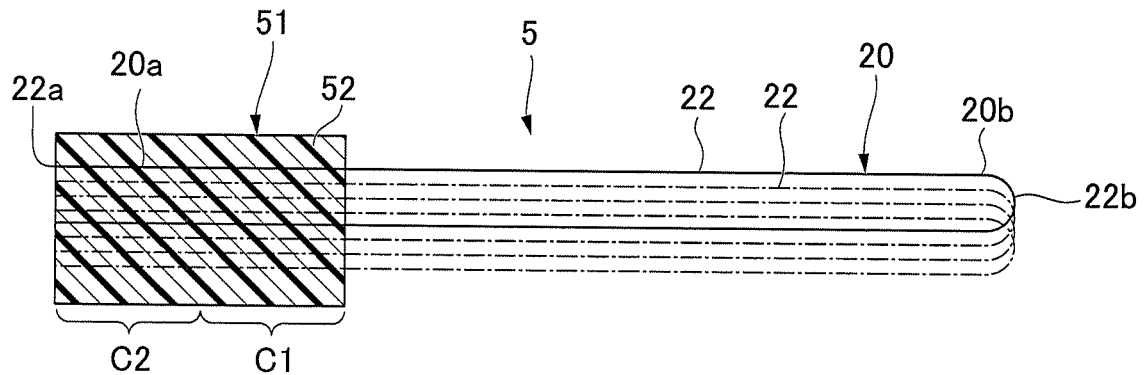
FIG. 6 is a cross-sectional view illustrating a hollow fiber membrane module according to a fifth embodiment of the invention.

FIG. 6 is a cross-sectional view illustrating a hollow fiber membrane module according to a second embodiment of the invention.

The hollow fiber membrane module 5 has a hollow fiber membrane bundle 20 and a collecting member 51.

In the following description, like reference numerals denote like elements as in the first embodiment, and they will not be described repeatedly.

(Hollow Fiber Membrane Bundle)

The hollow fiber membrane bundle 20 is a sheet-like bundle including a plurality of hollow fiber membranes 22 bent in a U-shape such that their length directions are aligned except for the bent portions 22b.

In the hollow fiber membrane bundle 20, the first ends 20a and their vicinities of the hollow fiber membrane bundle 20 in the opened end portion 22a side of the hollow fiber membrane 22 are collected by the collecting member 50, and the second ends 20b of the hollow fiber membrane bundle 20 in the bent portion 22b side of the hollow fiber membrane 22 are free ends.

Note that, although a plurality of hollow fiber membranes 22 are bound into a bundle by the collecting member 51 in the hollow fiber membrane bundle 20, for description purposes, only one hollow fiber membrane 22 is representatively indicated by a bold line, and other hollow fiber membranes 22 are indicated by one-dotted chain lines in FIG. 6. In addition, although each hollow fiber membrane 22 is illustrated as being bent in an U-shape on a single plane in FIG. 6, in practice, a plurality of hollow fiber membranes 22 are bundled in a three-dimensional shape (for example, in a circular cylindrical shape), and each hollow fiber membrane 22 is bent in an U-shape on different planes.

(Collecting Member)

The collecting member 51 includes a collecting resin 52.

The collecting resin 52 is used to bond the hollow fiber membranes 22 to each other in a liquid-tight manner at first end 20a and its vicinity of the hollow fiber membrane bundle 20 while maintaining the openings of the opened end portions 22a of the hollow fiber membranes 22.

A potting material serving as a material of the collecting resin 52 includes thermosetting resin (such as polyurethane, epoxy resin, silicon-based resin, and unsaturated polyester resin), or thermoplastic resin (such as polyolefin, fluorine-based resin).

The collecting member 51 has a circular cylindrical shape that can be fitted to the opening of the installation object such as a pipe fitting described below, and as a whole, serves as a coupling portion such that the collecting member 51 is coupled to the installation object in a detachable and liquid-tight manner.

That is, an exposed portion side of the hollow fiber membrane bundle 20 (a part of the hollow fiber membrane bundle 20 protruding on an end face of the collecting member 51 so as to be exposed to the outside) of the collecting member 51 is a first coupling portion C1 coupled to the objective liquid piping or the objective liquid casing, and a side of the collecting member 51 opposite to the exposed portion side of the hollow fiber membrane bundle 20 is a second coupling portion C2 coupled to the gas pipe.

(Method of Manufacturing Hollow Fiber Membrane Module)

The hollow fiber membrane module 5 according to the fifth embodiment may be manufactured, for example, in the following sequence. However, the method of manufacturing the hollow fiber membrane module according to the invention is not limited thereto.

- A hollow fiber membrane sheet of Raschel knitted fabrics is manufactured by connecting warped portions in both sides to warps of chain stitches while warping the hollow fiber membrane 22 as a weft at a predetermined length using a Raschel knitting machine.
- One warped end of the hollow fiber membrane sheet wound in a substantially cylindrical shape such that the bent portion of the hollow fiber membrane 22 becomes an end face is inserted into a cylindrical molding die.
- The collecting resin 52 is formed by supplying a liquid-phase potting material to the molding die and hardening or solidifying it.
- The hollow fiber membrane module 5 is obtained by removing the molding die, cutting the end of the collecting resin 52 for each warped end of the hollow fiber membrane sheet, and then forming the opened end portion 22a of the hollow fiber membrane 22.

(Action Mechanism)

In the hollow fiber membrane module 5 according to the fifth embodiment described above, it is possible to sufficiently perform degassing or gas supplying for the objective liquid for the following reasons.

(i) Since only the first end 20a and its vicinity of the hollow fiber membrane bundle 20 are collected by the collecting member 51, and the second end 20b is a free end, the objective liquid easily flows through the hollow fiber membrane 22, so that it is possible to effectively use the hollow fiber membrane 22. For this reason, the hollow fiber membrane module 5 can sufficiently perform degassing or gas supplying for the objective liquid.

The hollow fiber membrane module 5 according to the fifth embodiment described above can be provided inexpensively for the following reasons.

(ii) Since only the first ends 20a and its vicinities of the hollow fiber membrane bundle 20 are collected by the collecting member 51, a structure of the hollow fiber membrane module 5 itself is simple, compared to a hollow fiber membrane module in which both ends of the hollow fiber membrane bundle are fixed to the housing.

(iii) Since the collecting member 51 has a coupling portion for coupling the collecting member 51 to the installation object (such as an objective liquid piping, an objective liquid casing, or a gas pipe of the degassing and gas supplying device) in a detachable and liquid-tight manner, it is not necessary to replace the hollow fiber membrane bundle 20 for each degassing and gas supplying device including the objective liquid piping or objective liquid casing when the hollow fiber membrane bundle 20 is replaced.

(iv) It is possible to provide the hollow fiber membrane module 5 inexpensively due to the reasons (ii) and (iii).

In the hollow fiber membrane module 5 according to the fifth embodiment described above, it is possible to easily install the hollow fiber membrane module 5 in the installation object (such as the objective liquid piping, the objective liquid casing, or the gas pipe of the degassing and gas supplying device) for the following reasons.

(v) Since only the first ends 20a and its vicinities of the hollow fiber membrane bundle 20 are collected by the collecting member 51, and the second end 20b is a free end, an installation structure of the hollow fiber membrane module 5 for installation in the installation object becomes simple, compared to the hollow fiber membrane module in which both ends of the hollow fiber membrane bundle are fixed to the housing.

(vi) In addition to the reason (v), the collecting member 51 has the coupling portion for coupling the collecting member 51 to the installation object in a detachable and liquid-tight manner.

(vii) It is possible to easily install the hollow fiber membrane module 5 in the installation object due to the reasons (v) and (vi).

In the hollow fiber membrane module 5 according to the fifth embodiment described above, since the hollow fiber membrane 22 of the hollow fiber membrane bundle 20 is bent in a U-shape, it is possible to exhibit the same effects as those of the hollow fiber membrane module 1 of the first embodiment on the basis of the action mechanism similar to that of the hollow fiber membrane module 1 of the first embodiment.

In the hollow fiber membrane module 5 according to the fifth embodiment described above, locations of the bent portions 22b of the hollow fiber membrane bundle 20 are aligned to substantially match each other. Therefore, it possible to exhibit the same effects as those of the hollow fiber membrane module 1 of the first embodiment on the basis of the action mechanism similar to that of the hollow fiber membrane module 1 of the first embodiment.

Sixth Embodiment of Hollow Fiber Membrane Module

Figure 7:
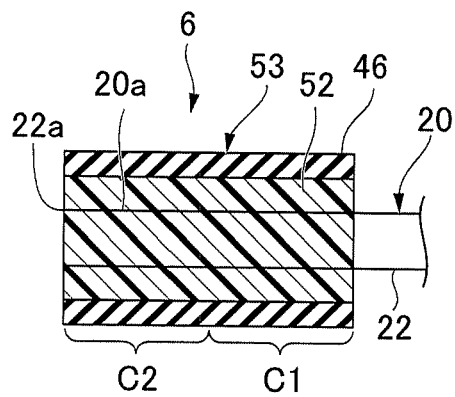
FIG. 7 is a cross-sectional view illustrating a hollow fiber membrane module according to a sixth embodiment of the invention.

FIG. 7 is a cross-sectional view illustrating a hollow fiber membrane module according to a sixth embodiment of the invention.

The hollow fiber membrane module 6 has a hollow fiber membrane bundle 20 and a collecting member 53.

Note that, in the hollow fiber membrane bundle 20, only one of the hollow fiber membranes 22 is representatively drawn as a bold line, in practice, a plurality of hollow fiber membranes 22 are bundled.

In the following description, like reference numerals denote like elements as in the first or fifth embodiment, and they will not be described repeatedly.

(Collecting Member)

The collecting member 53 has a collecting resin 52 and a sealant layer 46 that surrounds the outer peripheral surface of the collecting resin 52.

The sealant layer 46 seals a gap between the collecting member 53 and the installation object when the collecting member 53 is coupled to the installation object. The sealant layer 46 may be formed of the same material as that of the O-ring 42 described above.

The collecting member 53 has a circular cylindrical shape that can be fitted to the opening of the installation object such as a pipe fitting described below, and as a whole, serves as a coupling portion such that the collecting member 53 is coupled to the installation object in a detachable and liquid-tight manner.

That is, the exposed portion side of the hollow fiber membrane bundle 20 of the collecting member 53 is a first coupling portion C1 coupled to the objective liquid piping or the objective liquid casing, and a side opposite to the exposed portion side of the hollow fiber membrane bundle 20 of the collecting member 53 is a second coupling portion C2 coupled to the gas pipe.

(Action Mechanism)

The hollow fiber membrane module 6 according to the sixth embodiment described above can exhibit the same effects as those of the hollow fiber membrane module 5 of the fifth embodiment on the basis of the action mechanism similar to that of the hollow fiber membrane module 5 of the fifth embodiment.

Seventh Embodiment of Hollow Fiber Membrane Module

Figure 8:
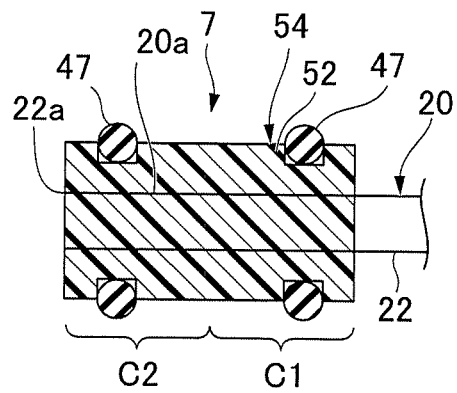
FIG. 8 is a cross-sectional view illustrating a hollow fiber membrane module according to a seventh embodiment of the invention.

FIG. 8 is a cross-sectional view illustrating a hollow fiber membrane module according to a seventh embodiment of the invention.

The hollow fiber membrane module 7 has a hollow fiber membrane bundle 20 and a collecting member 54.

Note that, although only one of the hollow fiber membranes 22 is representatively drawn as a bold line in the hollow fiber membrane bundle 20, in practice, a plurality of hollow fiber membranes 22 are bundled.

In the following description, like reference numerals denote like elements as in the first or fifth embodiment, and they will not be described repeatedly.

(Collecting Member)

The collecting member 54 has a collecting resin 52 and a pair of O-rings 47 (sealant member) provided in the peripheral direction of the outer peripheral surface of the collecting resin 52.

A pair of trenches extending in the peripheral direction are formed to receive the O-rings 47 on the outer peripheral surface of the collecting resin 52.

The O-ring 47 is an installation means for coupling the collecting member 54 to the installation object in a detachable and liquid-tight manner. The O-ring 47 may be formed of the same material as that of the O-ring 42.

The collecting member 54 has a circular cylindrical shape that can be fitted to the opening of the installation object such as a pipe fitting described below, and as a whole, serves as a coupling portion such that the collecting member 54 is coupled to the installation object in a detachable and liquid-tight manner.

That is, the exposed portion side of the hollow fiber membrane bundle 20 of the collecting member 54 is a first coupling portion C1 coupled to the objective liquid piping or the objective liquid casing, and a side opposite to the exposed portion side of the hollow fiber membrane bundle 20 of the collecting member 54 is a second coupling portion C2 coupled to the gas pipe. Each of the first and second coupling portions C1 and C2 is provided with the O-ring 47.

(Action Mechanism)

The hollow fiber membrane module 7 according to the seventh embodiment described above can exhibit the same effects as those of the hollow fiber membrane module 5 of the fifth embodiment on the basis of the action mechanism similar to that of the hollow fiber membrane module 5 of the fifth embodiment.

Eighth Embodiment of Hollow Fiber Membrane Module

Figure 9:
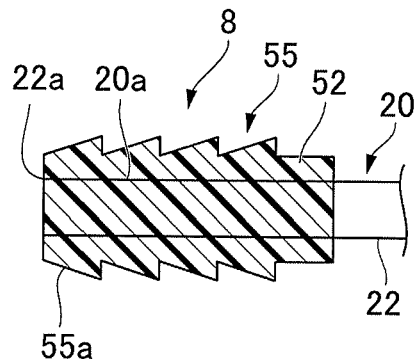
FIG. 9 is a cross-sectional view illustrating a hollow fiber membrane module according to an eighth embodiment of the invention.

FIG. 9 is a cross-sectional view illustrating a hollow fiber membrane module according to an eighth embodiment of the invention.

The hollow fiber membrane module 8 has a hollow fiber membrane bundle 20 and a collecting member 55.

Note that, although only one of the hollow fiber membranes 22 is representatively drawn as a bold line in the hollow fiber membrane bundle 20, in practice, a plurality of hollow fiber membranes 22 are bundled.

In the following description, like reference numerals denote like elements as in the first or fifth embodiment, and they will not be described repeatedly.

(Collecting Member)

The collecting member 55 has a collecting resin 52.

A barb fitting 55a (hose nipple) is formed on the outer peripheral surface of the collecting member 55, and the collecting member 55 is pressedly inserted into the opening of the installation object so as to be coupled to the installation object. In the illustrated example, a side opposite to the exposed portion side of the hollow fiber membrane bundle 20 of the collecting member 55 is a tip side. Alternatively, the exposed portion side of the hollow fiber membrane bundle 20 of the collecting member 55 may be the tip side.

(Action Mechanism)

The hollow fiber membrane module 8 according to the eighth embodiment described above can exhibit the same effects as those of the hollow fiber membrane module 5 of the fifth embodiment on the basis of the action mechanism similar to that of the hollow fiber membrane module 5 of the fifth embodiment.

Ninth Embodiment of Hollow Fiber Membrane Module

Figure 10:
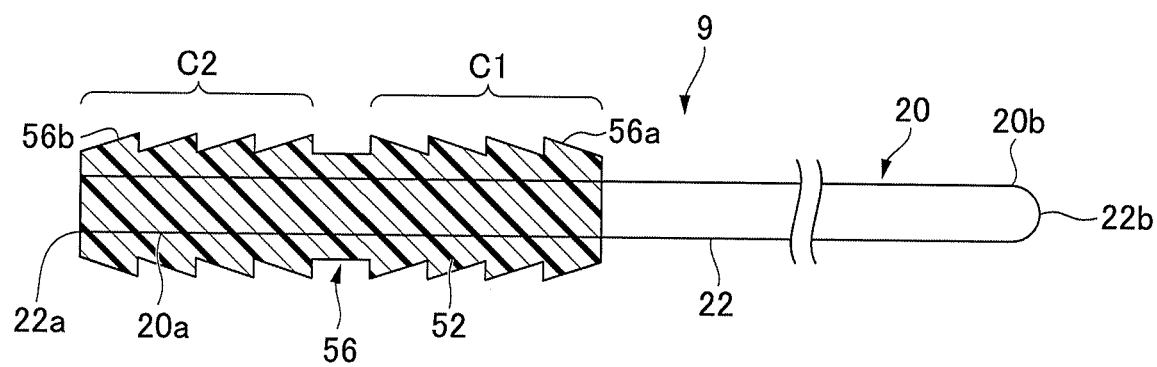
FIG. 10 is a cross-sectional view illustrating a hollow fiber membrane module according to a ninth embodiment of the invention.

FIG. 10 is a cross-sectional view illustrating a hollow fiber membrane module according to a ninth embodiment of the invention.

The hollow fiber membrane module 9 has a hollow fiber membrane bundle 20 and a collecting member 56.

Note that, although only one of the hollow fiber membranes 22 is representatively drawn as a bold line in the hollow fiber membrane bundle 20, in practice, a plurality of hollow fiber membranes 22 are bundled.

In the following description, like reference numerals denote like elements as in the first or fifth embodiment, and they will not be described repeatedly.

(Collecting Member)

The collecting member 56 has a collecting resin 52.

A barb fitting 56a formed such that the exposed portion side of the hollow fiber membrane bundle 20 of the collecting member 56 is the tip side and a barb fitting 56b formed such that the side of the collecting member 56 opposite to the exposed portion of the hollow fiber membrane bundle 20 is the tip side are formed on the outer peripheral surface of the collecting member 56. The collecting member 56 is pressedly inserted into the opening of the installation object or the like so as to be coupled to the installation object.

The collecting member 56 has an external shape that can be fitted to the opening of the installation object, such as a pipe fitting described below, and as a whole, serves as a coupling portion for coupling the collecting member 56 to the installation object in a detachable and liquid-tight manner.

That is, an exposed portion side of the hollow fiber membrane bundle 20 of the collecting member 56 is a first coupling portion C1 coupled to the objective liquid piping or the objective liquid casing, and a side opposite to the exposed portion side of the hollow fiber membrane bundle 20 of the collecting member 56 is a second coupling portion C2 coupled to the gas pipe. The first coupling portion C1 has the barb fitting 56a, and the second coupling portion C2 has the barb fitting 56b.

(Action Mechanism)

The hollow fiber membrane module 9 according to the ninth embodiment described above can exhibit the same effects as those of the hollow fiber membrane module 5 of the fifth embodiment on the basis of the action mechanism similar to that of the hollow fiber membrane module 5 of the fifth embodiment.

Tenth Embodiment of Hollow Fiber Membrane Module

Figure 11:
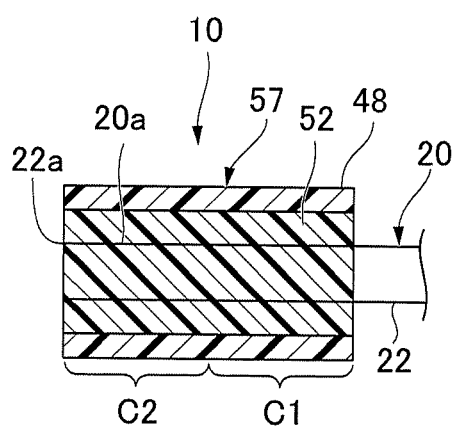
FIG. 11 is a cross-sectional view illustrating a hollow fiber membrane module according to a tenth embodiment of the invention.

FIG. 11 is a cross-sectional view illustrating a hollow fiber membrane module according to a tenth embodiment of the invention.

The hollow fiber membrane module 10 has a hollow fiber membrane bundle 20 and a collecting member 57.

Note that, although only one of the hollow fiber membranes 22 is representatively drawn as a bold line in the hollow fiber membrane bundle 20, in practice, a plurality of hollow fiber membranes 22 are bundled.

In the following description, like reference numerals denote like elements as in the first or fifth embodiment, and they will not be described repeatedly.

(Collecting Member)

The collecting member 57 has a collecting resin 52 and a resin layer 48 that surrounds the outer peripheral surface of the collecting resin 52.

Coupling to a pipe fitting for the resin tube becomes easy by forming the collecting resin 52 in a circular cylindrical shape and providing a resin layer 48 similar to the resin tube standardized for piping on the outer peripheral surface of the collecting resin 52. The resin tubes of various materials and various diameters are employed widely for piping, and various pipe fittings for the resin tube are also commercially available in the market. The resin layer 48 may have an outer diameter and a thickness suitably selected depending on a structure of the pipe fitting for the resin tube. The resin layer 48 may be formed of a resin material for the resin tube known in the art.

A metal layer similar to the metal tube standardized for piping may be provided instead of the resin layer 48.

The collecting member 57 has a circular cylindrical shape that can be fitted to the opening of the installation object such as a pipe fitting described below, and as a whole, serves as a coupling portion for coupling the collecting member 57 to the installation object in a detachable and liquid-tight manner.

That is, an exposed portion side of the hollow fiber membrane bundle 20 of the collecting member 57 is a first coupling portion C1 coupled to the objective liquid piping or the objective liquid casing, and a side opposite to the exposed portion side of the hollow fiber membrane bundle 20 of the collecting member 57 is a second coupling portion C2 coupled to the gas pipe.

(Action Mechanism)

The hollow fiber membrane module 10 according to the tenth embodiment described above can exhibit the same effects as those of the hollow fiber membrane module 5 of the fifth embodiment on the basis of the action mechanism similar to that of the hollow fiber membrane module 5 of the fifth embodiment.

Eleventh Embodiment of Hollow Fiber Membrane Module

Figure 12:
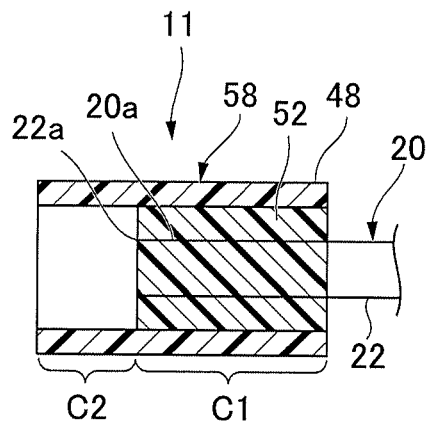
FIG. 12 is a cross-sectional view illustrating a hollow fiber membrane module according to an eleventh embodiment of the invention.

FIG. 12 is a cross-sectional view illustrating a hollow fiber membrane module according to an eleventh embodiment of the invention.

The hollow fiber membrane module 11 has a hollow fiber membrane bundle 20 and a collecting member 58.

Note that, although only one of the hollow fiber membranes 22 is representatively drawn as a bold line in the hollow fiber membrane bundle 20, in practice, a plurality of hollow fiber membranes 22 are bundled.

In the following description, like reference numerals denote like elements as in the first or fifth embodiment, and they will not be described repeatedly.

(Collecting Member)

The collecting member 58 has a collecting resin 52 and a resin layer 48 that surrounds the outer peripheral surface of the collecting resin 52.

An end face of the collecting resin 52 of the exposed portion side of the hollow fiber membrane bundle 20 matches an end face of the resin layer 48. However, an end face of the collecting resin 52 opposite to the exposed portion side of the hollow fiber membrane bundle 20 is placed inside the resin layer 48. As a result, the resin layer 48 in the side of the collecting member 58 opposite to the exposed portion side of the hollow fiber membrane bundle 20 can be coupled to the pipe fitting similarly to a typical resin tube.

The collecting member 58 has a circular cylindrical shape that can be fitted to the opening of the installation object, such as a pipe fitting described below, and as a whole, serves as a coupling portion for coupling the collecting member 58 to the installation object in a detachable and liquid-tight manner.

That is, an exposed portion side of the hollow fiber membrane bundle 20 of the collecting member 58 is a first coupling portion C1 coupled to the objective liquid piping or the objective liquid casing, and a resin layer 48 in the side opposite to the exposed portion side of the hollow fiber membrane bundle 20 of the collecting member 58 is a second coupling portion C2 coupled to a pipe fitting of the gas supply side.

(Action Mechanism)

The hollow fiber membrane module 11 according to the eleventh embodiment described above can exhibit the same effects as those of the hollow fiber membrane module 5 of the fifth embodiment on the basis of the action mechanism similar to that of the hollow fiber membrane module 5 of the fifth embodiment.

Twelfth Embodiment of Hollow Fiber Membrane Module

Figure 13:
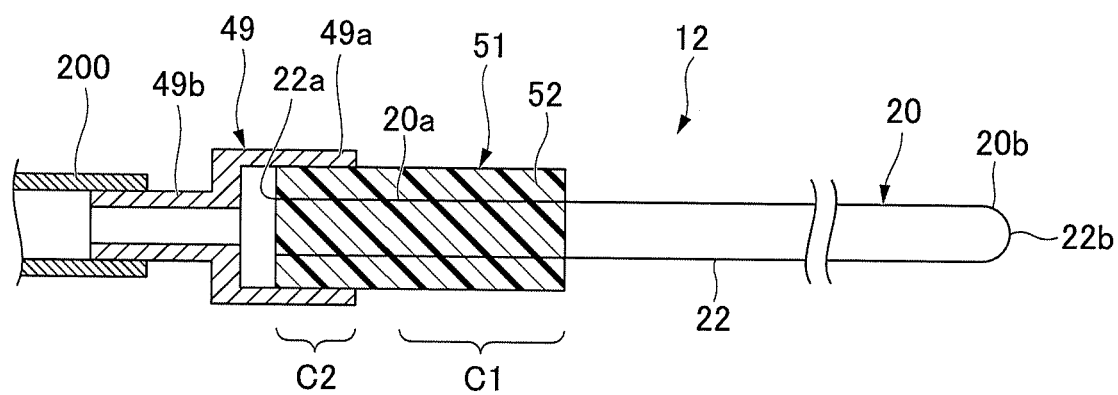
FIG. 13 is a cross-sectional view illustrating a hollow fiber membrane module according to a twelfth embodiment of the invention.

FIG. 13 is a cross-sectional view illustrating a hollow fiber membrane module according to a twelfth embodiment of the invention.

The hollow fiber membrane module 12 has a hollow fiber membrane bundle 20, a collecting member 51, and a pipe fitting 49.

Note that, although only one of the hollow fiber membranes 22 is representatively drawn as a bold line in the hollow fiber membrane bundle 20, in practice, a plurality of hollow fiber membranes 22 are bundled.

In the following description, like reference numerals denote like elements as in the first or fifth embodiment, and they will not be described repeatedly.

(Pipe Fitting)

The pipe fitting 49 is a fitting inserted for coupling between the collecting member 51 and the gas pipe 200 and has a circular cylindrical large-diameter portion 49a where the collecting member 51 is fitted, and a circular cylindrical small-diameter portion 49b fitted to the gas pipe 200.

(Collecting Member)

The collecting member 51 has a circular cylindrical shape that can be fitted to the opening of the installation object, such as a pipe fitting, and as a whole, serves as a coupling portion for coupling the collecting member 51 to the installation object in a detachable and liquid-tight manner.

That is, an exposed portion side of the hollow fiber membrane bundle 20 of the collecting member 51 is a first coupling portion C1 coupled to the objective liquid piping or the objective liquid casing, and a side opposite to the exposed portion side of the hollow fiber membrane bundle 20 of the collecting member 51 is a second coupling portion C2 coupled to the pipe fitting 49.

(Action Mechanism)

The hollow fiber membrane module 12 according to the twelfth embodiment described above can exhibit the same effects as those of the hollow fiber membrane module 5 of the fifth embodiment on the basis of the action mechanism similar to that of the hollow fiber membrane module 5 of the fifth embodiment.

Other Embodiments of Hollow Fiber Membrane Module

Note that the invention is not limited to the hollow fiber membrane modules according to the first to twelfth embodiments in the illustrated examples as long as a hollow fiber membrane module for removing a gas from an objective liquid or supplying gas to the objective liquid includes a hollow fiber membrane bundle having a plurality of hollow fiber membranes whose length directions are aligned, and a collecting member that collects first ends of the hollow fiber membrane bundle while maintaining an opening of an opened end portion of the hollow fiber membrane, in which the collecting member has a coupling portion that couples the collecting member to the installation object in a detachable and liquid-tight manner.

For example, the installation means provided in the housing may include an installation means other than the thread and the O-ring, such as a bayonet type installation means.

The hollow fiber membrane bundle may have a plurality of hollow fiber membranes whose length directions are aligned without being bent in a U-shape, and the first opened end portion of the hollow fiber membrane may be a free end while being blocked individually. The second opened end portion of the hollow fiber membrane may be buried in the fixing portion while maintaining its opening.

The hollow fiber membrane bundle may not have the constraining yarn. Alternatively, two or more pieces of constraining yarn may also be provided.

A plurality of gas access ports may be formed per one housing.

First Embodiment of Degassing and Gas Supplying Device

Figure 14:
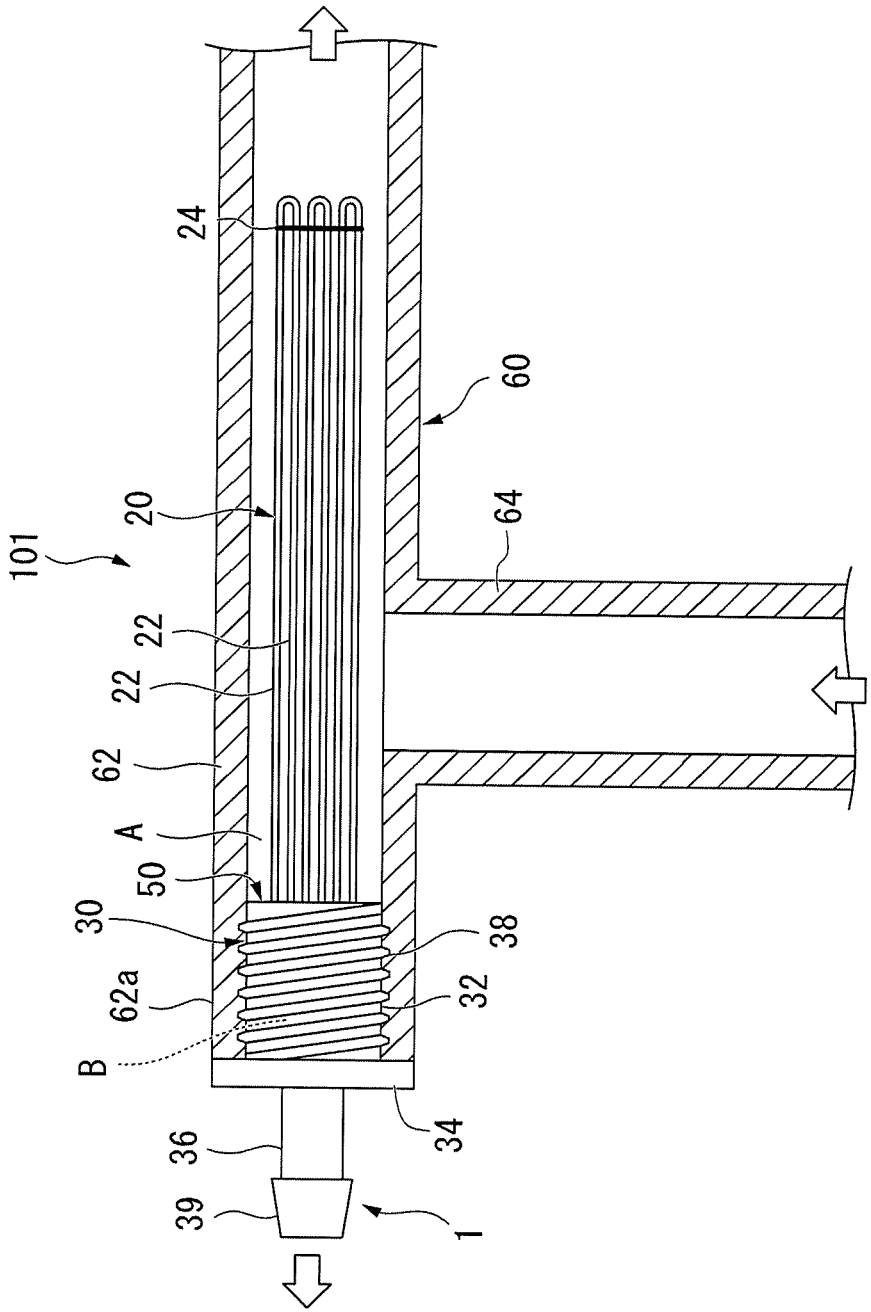
FIG. 14 is a cross-sectional view illustrating a degassing and gas supplying device according to a first embodiment of the invention.

FIG. 14 is a cross-sectional view illustrating a degassing and gas supplying device according to a first embodiment of the invention.

The degassing and gas supplying device 101 has a hollow fiber membrane module 1 and a T-pipe 60 (as an objective liquid piping or a branch pipe).

(T-pipe)

The T-pipe 60 has a circular cylindrical main pipe 62 and a side pipe 64 branching from the main pipe 62.

A first end 62a of the main pipe 62 (insertion opening of the hollow fiber membrane module) is provided with a female thread (second installation means).

A first space A adjoining the outer side of the hollow fiber membrane 22 of the hollow fiber membrane bundle 20 is formed inside the T-pipe 60.

(Hollow Fiber Membrane Module)

The hollow fiber membrane module 1 is inserted into the T-pipe 60 from the first end 62a of the main pipe 62 such that the exposed portion of the hollow fiber membrane bundle 20 is located inside the main pipe 62.

A thread 38 (male thread or first installation means) provided in the housing body 32 (coupling portion) of the housing 30 of the collecting member 50 and a female thread (second installation means) of the first end 62a of the main pipe are screwed to each other, so that a flange portion 34 (coupling portion) of the housing 30 abuts on an end face of the first end 62a of the main pipe 62. As a result, the hollow fiber membrane module 1 is installed in the T-pipe 60 in a detachable and liquid-tight manner.

(Degassing Method or Gas Supplying Method)

Degassing for the objective liquid using the degassing and gas supplying device 101 according to the first embodiment may be performed in the following way.

A vacuum pump (not illustrated) is coupled to a hose fitting 39 (installation means) in the tip of the gas access nozzle 36 (coupling portion) of the housing 30 using a gas pipe (not illustrated).

A pressurizing/feeding pump (not illustrated) is coupled to a start end of the side pipe 64 (objective liquid inlet), or a suction pump (not illustrated) is coupled to a terminated end of the main pipe 62 (treatment liquid outlet).

The second space B inside the housing 30 is decompressed by actuating the vacuum pump, so that the inside of the hollow fiber membrane 22 of the hollow fiber membrane bundle 20 communicating with the second space B is decompressed.

The objective liquid is supplied from the side pipe 64 to the first space A of the main pipe 62 by actuating the pressurizing/feeding pump or the suction pump.

The objective liquid supplied to the first space A flows through the first space A along the length direction of the hollow fiber membrane 22.

The treatment liquid flowing through the first space A is discharged to the outside of the degassing and gas supplying device 101 through the main pipe 62.

While the objective liquid flows through the first space A, the objective liquid makes contact with the outer side of the hollow fiber membrane 22. A dissolved gas contained in the objective liquid making contact with the outer side of the hollow fiber membrane 22 moves from the outer side of the hollow fiber membrane 22 to the inner side having the decompressed state. As a result, the dissolved gas is removed from the objective liquid.

Note that gas supplying for the objective liquid may be performed by coupling a booster pump, a gas reservoir, or the like to the gas access nozzle 36 of the housing 30 using a gas pipe instead of the vacuum pump.

The objective liquid as a degassing or gas supplying target may include water, an organic solvent, a solution in which an arbitrary component is dissolved in a liquid medium (such as water or an organic solvent), a dispersion liquid in which an arbitrary component is dispersed in a liquid medium, or the like. The gas to be degassed is a gas dissolved in the objective liquid. The gas to be supplied may include oxygen, hydrogen, nitrogen, helium, a carbon dioxide gas, a laughing gas, a mixed gas thereof, or the like.

(Action Mechanism)

The degassing and gas supplying device 101 according to the first embodiment described above has the hollow fiber membrane module 1 capable of sufficiently performing degassing or gas supplying for an objective liquid and inexpensively providing degassing or gas supplying and easily installable in the installation object. Therefore, it is possible to sufficiently perform degassing or gas supplying for the objective liquid, inexpensively provide degassing or gas supplying, and easily detachably install the hollow fiber membrane module 1.

Second Embodiment of Degassing and Gas Supplying Device

Figure 15:
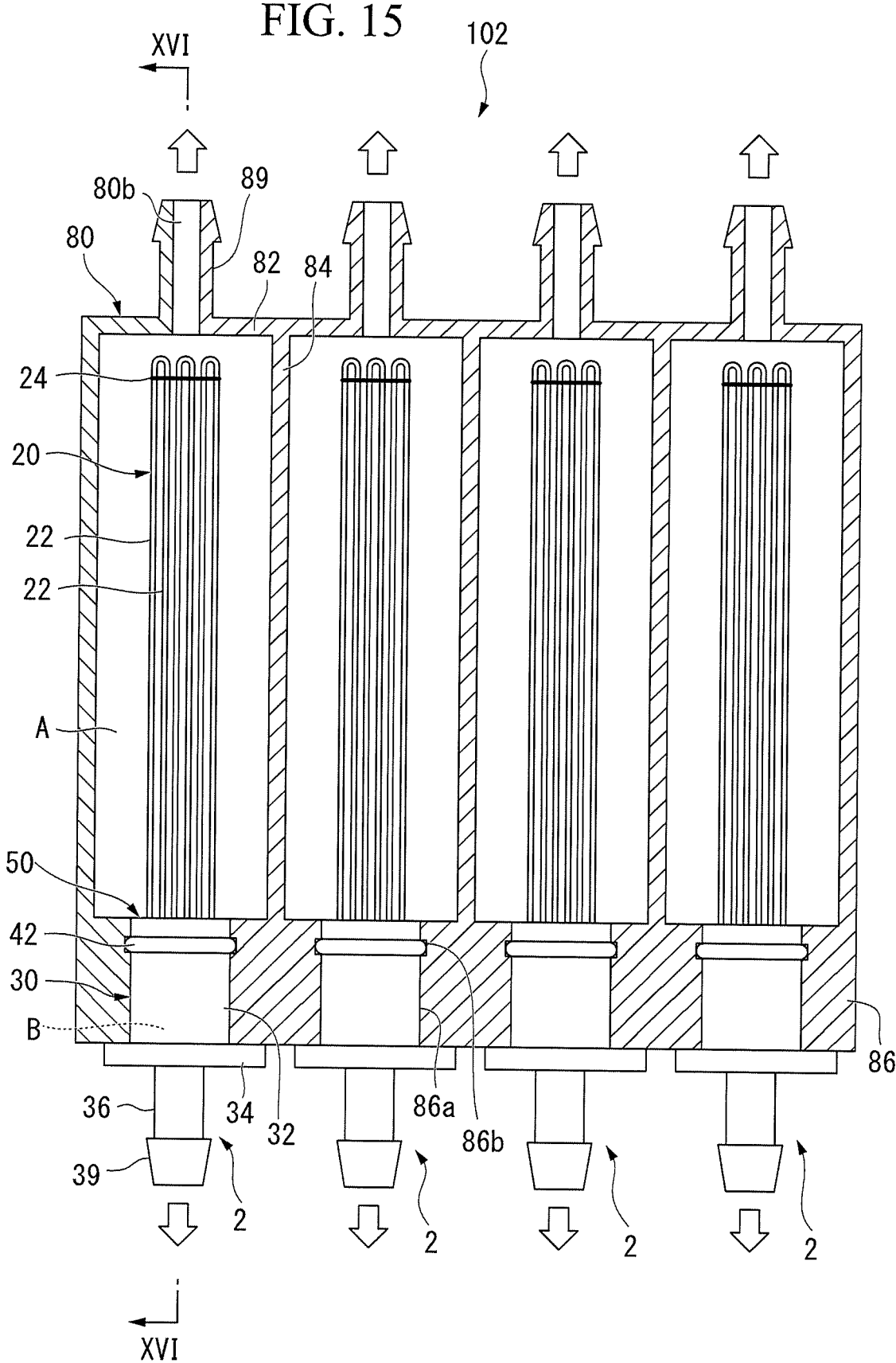
FIG. 15 is a cross-sectional view illustrating a degassing and gas supplying device according to a second embodiment of the invention.
Figure 16:
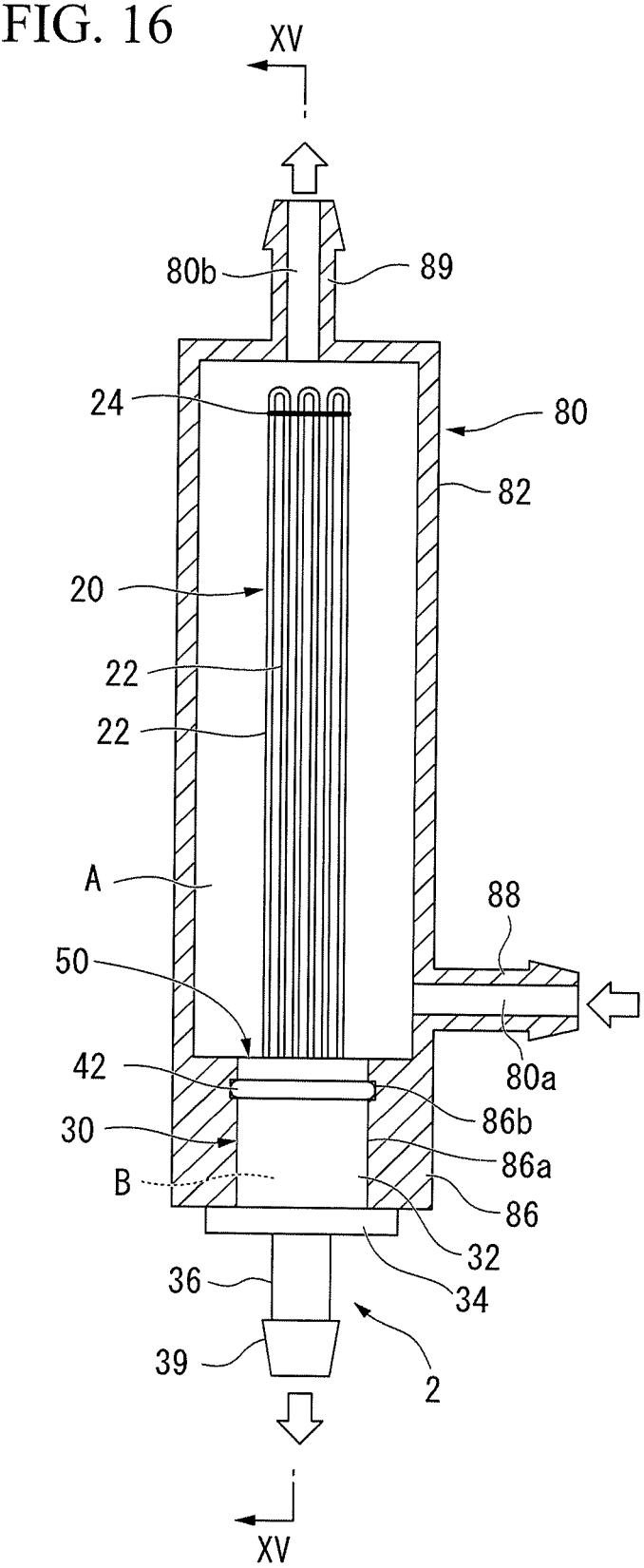
FIG. 16 is a cross-sectional view taken along a line XVI-XVI of the degassing and gas supplying device of FIG. 15.

FIG. 15 is a cross-sectional view illustrating a degassing and gas supplying device according to a second embodiment of the invention (cross-sectional view taken long the line XV-XV of FIG. 16). FIG. 16 is a cross-sectional view taken along the line XVI-XVI to illustrate the degassing and gas supplying device of FIG. 15.

The degassing and gas supplying device 102 according to the second embodiment has a hollow fiber membrane module 2 and a casing 80 (objective liquid casing).

(Casing)

The casing 80 has a box-shaped casing body 82, three partition plates 84 that partitions the inside of the casing body 82 into four vertically thin compartments, module fixing portions 86 formed in a bottom portion of the casing body 82 for each compartment, objective liquid inlet nozzles 88 extending from the lower portion of the casing body 82 to lateral sides for each compartment, and treatment liquid outlet nozzles 89 extending upward from the upper portion of the casing body 82 for each compartment.

A first space A adjoining the outer side of the hollow fiber membrane 22 of the hollow fiber membrane bundle 20 is formed in each compartment of the casing body 82.

The module fixing portion 86 is provided with a module insertion opening 86*a* communicating with the first space A and having a shape matching that of the housing body 32 of the hollow fiber membrane module 1 (the insertion opening of the hollow fiber membrane module).

The objective liquid inlet nozzle 88 has an objective liquid inlet 80*a* communicating with the first space A.

The treatment liquid outlet nozzle 89 has a treatment liquid outlet 80*b* communicating with the first space A.

(Hollow Fiber Membrane Module)

The hollow fiber membrane module 2 is inserted from the module insertion opening 86*a* for each compartment into the compartment such that the exposed portion of the hollow fiber membrane bundle 20 is placed inside the compartment of the casing body 82.

The hollow fiber membrane module 2 is installed in the casing 80 in a detachable and liquid-tight manner by engaging an O-ring 42 (first installation means) provided in the housing body 32 (coupling portion) of the housing 30 of the collecting member 50 and a trench 86*b* (second installation means) formed in an inner peripheral surface of the module insertion opening 86*a* to extend in a peripheral direction with each other and allowing a flange portion 34 of the housing 30 and an outer bottom surface of the casing body 82 to abut on each other.

(Degassing Method or Gas Supplying Method)

Degassing for the objective liquid using the degassing and gas supplying device 102 according to the second embodiment may be performed in the following way.

A vacuum pump (not illustrated) is coupled to a hose fitting 39 (installation means) in the tip of the gas access nozzle 36 (coupling portion) of the housing 30 using a gas pipe (not illustrated).

A pressurizing/feeding pump (not illustrated) is coupled to the objective liquid inlet nozzle 88 of the casing 80 using a liquid feeding pipe (not illustrated), or a suction pump (not illustrated) is coupled to the treatment liquid outlet nozzle 89 using a liquid feeding pipe (not illustrated).

The second space B inside the housing 30 is decompressed by actuating the vacuum pump, so that the inside of the hollow fiber membrane 22 of the hollow fiber membrane bundle 20 communicating with the second space B is decompressed.

The objective liquid is supplied from the objective liquid inlet nozzle 88 to the first space A of the casing 80 by actuating the pressurizing/feeding pump or the suction pump.

The objective liquid supplied to the first space A flows through the first space A along the length direction of the hollow fiber membrane 22.

The treatment liquid flowing through the first space A is discharged to the outside of the degassing and gas supplying device 102 through the treatment liquid outlet nozzle 89.

While the objective liquid flows through the first space A, the objective liquid makes contact with the outer side of the hollow fiber membrane 22. A dissolved gas contained in the objective liquid making contact with the outer side of the hollow fiber membrane 22 moves from the outer side of the hollow fiber membrane 22 to the inner side having the decompressed state. As a result, the dissolved gas is removed from the objective liquid.

Note that gas supplying for the objective liquid may be performed by coupling a booster pump, a gas reservoir, or the like to the gas access nozzle 36 of the housing 30 using a gas pipe instead of the vacuum pump.

The objective liquid as a degassing or gas supplying target, the gas to be degassed, the gas to be supplied may be similar to those of the first embodiment.

(Action Mechanism)

The degassing and gas supplying device 102 according to the second embodiment described above has the hollow fiber membrane module 2 that can sufficiently perform degassing or gas supplying for the objective liquid, inexpensively provide degassing or gas supplying, and is easily installable in the installation object. Therefore, it is possible to sufficiently perform degassing or gas supplying for the objective liquid, inexpensively provide degassing or gas supplying, and easily detachably install the hollow fiber membrane module 2.

Third Embodiment of Degassing and Gas Supplying Device

Figure 17:
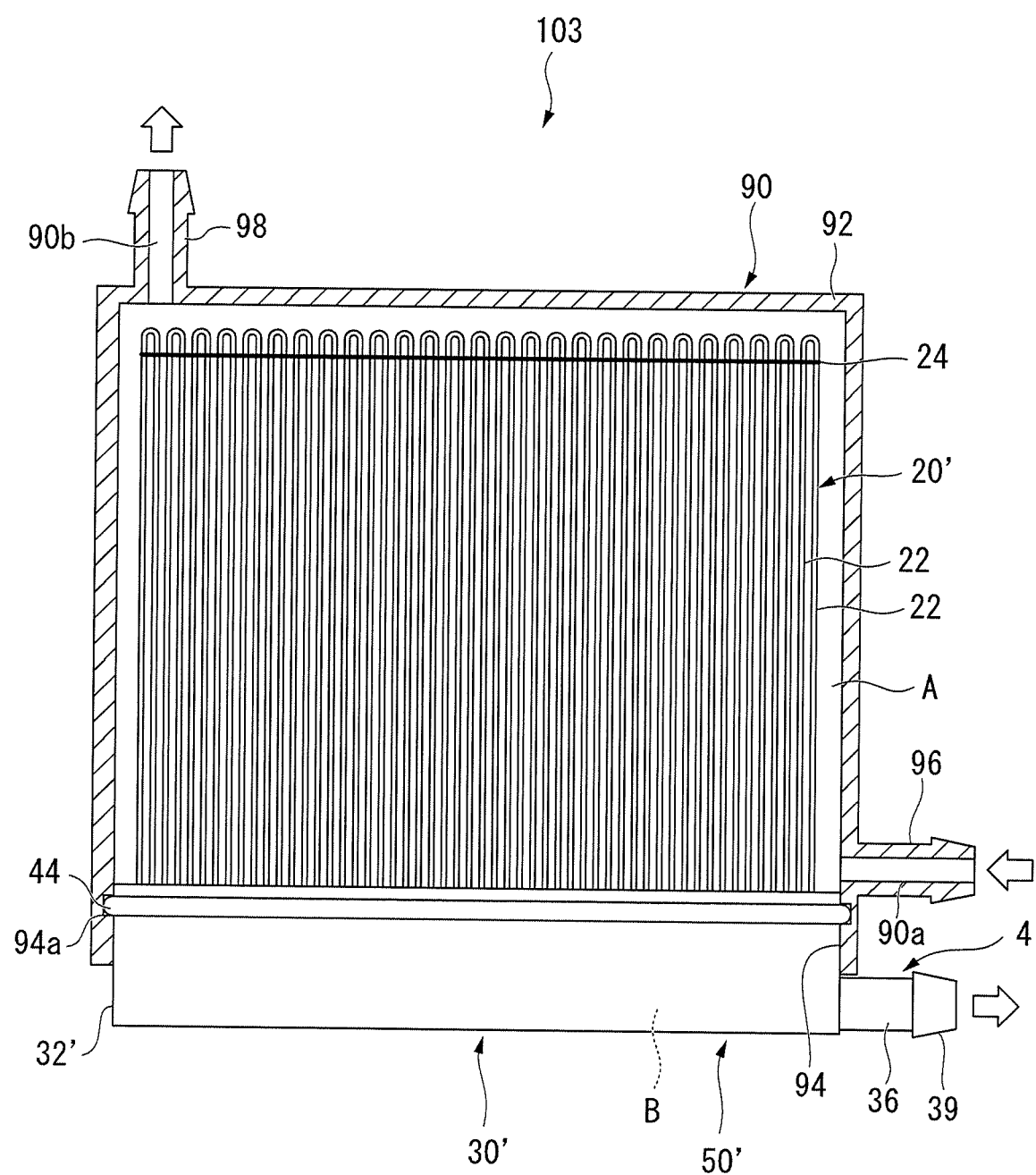
FIG. 17 is a cross-sectional view illustrating a degassing and gas supplying device according to a third embodiment of the invention.

FIG. 17 is a cross-sectional view illustrating a degassing and gas supplying device according to a third embodiment of the invention.

The degassing and gas supplying device 103 according to the third embodiment has a hollow fiber membrane module 4 and a casing 90 (objective liquid casing).

(Casing)

The casing 90 has a flat box-shaped casing body 92 having a lower casing opening 94 (the insertion opening of the hollow fiber membrane module) shaped to match the housing body 32' of the hollow fiber membrane module 4, an objective liquid inlet nozzle 96 extending from a lower part of the casing body 92 to the lateral side, and a treatment liquid outlet nozzle 98 extending upward from an upper part of the casing body 92.

A first space A adjoining the outer side of the hollow fiber membrane 22 of the hollow fiber membrane bundle 20' is formed inside the casing body 92.

The objective liquid inlet nozzle 96 has an objective liquid inlet 90a communicating with the first space A.

The treatment liquid outlet nozzle 98 has a treatment liquid outlet 90b communicating with the first space A.

(Hollow Fiber Membrane Module)

The hollow fiber membrane module 4 is inserted from the casing opening 94 into the casing body 92 such that the exposed portion of the hollow fiber membrane bundle 20' is placed inside the casing body 92.

The hollow fiber membrane module 4 is installed in the casing 90 in a detachable and liquid-tight manner by engaging a seal member 44 (first installation means) provided in the housing body 32' (coupling portion) of the housing 30' of the collecting member 50' and a trench 94a (second installation means) formed on the inner peripheral surface of the casing opening 94 of the casing body 92 to extend in the peripheral direction with each other.

(Degassing Method or Gas Supplying Method)

Degassing for the objective liquid using the degassing and gas supplying device 103 according to the third embodiment may be performed in the following way.

A vacuum pump (not illustrated) is coupled to a hose fitting 39 (installation means) in the tip of the gas access nozzle 36 (coupling portion) of the housing 30' using a gas pipe (not illustrated).

A pressurizing/feeding pump (not illustrated) is coupled to the objective liquid inlet nozzle 96 of the casing 90 using a liquid feeding pipe (not illustrated), or a suction pump (not illustrated) is coupled to the treatment liquid outlet nozzle 98 using a liquid feeding pipe (not illustrated).

The second space B inside the housing 30' is decompressed by actuating the vacuum pump, so that the inside of the hollow fiber membrane 22 of the hollow fiber membrane bundle 20' communicating with the second space B is decompressed.

The objective liquid is supplied from the objective liquid inlet nozzle 96 to the first space A of the casing 90 by actuating the pressurizing/feeding pump or the suction pump.

The objective liquid supplied to the first space A flows through the first space A along the length direction of the hollow fiber membrane 22.

The treatment liquid flowing through the first space A is discharged to the outside of the degassing and gas supplying device 103 through the treatment liquid outlet nozzle 98.

While the objective liquid flows through the first space A, the objective liquid makes contact with the outer side of the hollow fiber membrane 22. A dissolved gas contained in the objective liquid making contact with the outer side of the hollow fiber membrane 22 moves from the outer side of the hollow fiber membrane 22 to the inner side having the decompressed state. As a result, the dissolved gas is removed from the objective liquid.

Note that gas supplying for the objective liquid may be performed by coupling a booster pump, a gas reservoir, or the like to the gas access nozzle 36 of the housing 30' using a gas pipe instead of the vacuum pump.

The objective liquid as a degassing or gas supplying target, the gas to be degassed, the gas to be supplied may be similar to those of the first embodiment.

(Action Mechanism)

The degassing and gas supplying device 103 according to the third embodiment described above has the hollow fiber membrane module 4 capable of sufficiently performing degassing or gas supplying for the objective liquid and inexpensively providing degassing or gas supplying and easily installable in the installation object. Therefore, it is possible to sufficiently perform degassing or gas supplying for the objective liquid, inexpensively provide degassing or gas supplying, and easily detachably install the hollow fiber membrane module 4.

Fourth Embodiment of Degassing and Gas Supplying Device

Figure 18:
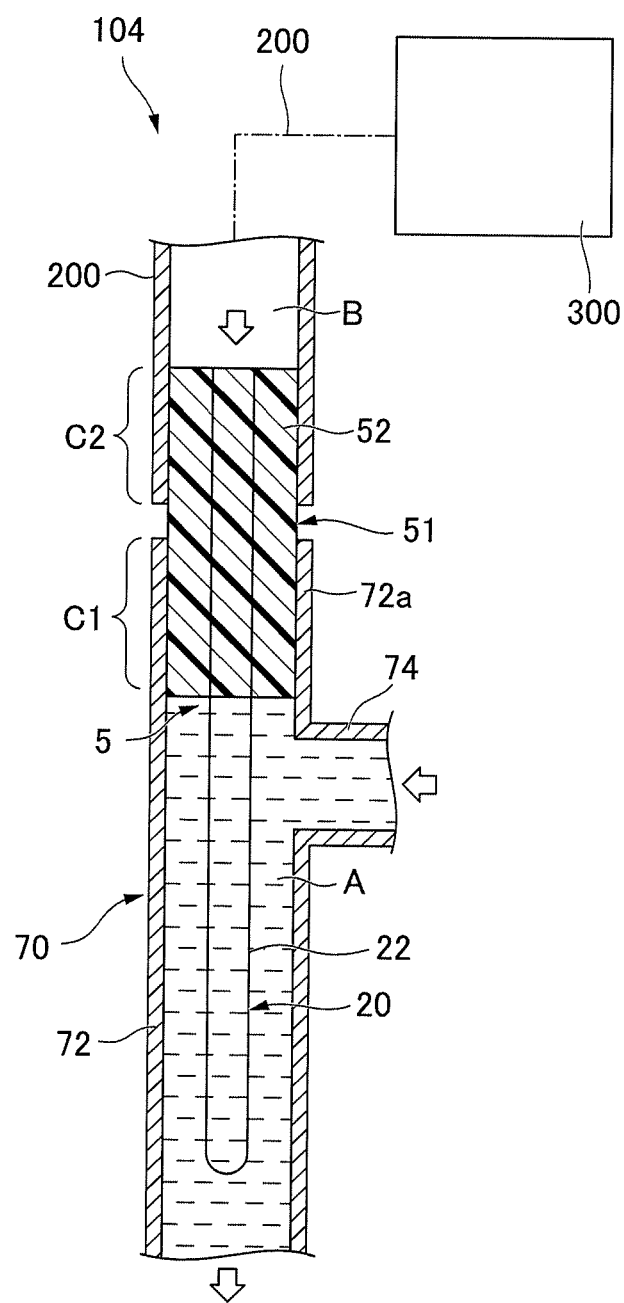
FIG. 18 is a cross-sectional view illustrating a degassing and gas supplying device according to a fourth embodiment of the invention.

FIG. 18 is a cross-sectional view illustrating a degassing and gas supplying device according to a fourth embodiment of the invention.

The degassing and gas supplying device 104 has a hollow fiber membrane module 5, a T-pipe 70 (an objective liquid piping or a branch pipe), a gas pipe 200, and a gas supply source 300.

Note that, although only one of the hollow fiber membranes 22 of the hollow fiber membrane module 5 is representatively drawn as a bold line, in practice, a plurality of hollow fiber membranes 22 are bundled.

(T-pipe)

The T-pipe 70 has a circular cylindrical main pipe 72 and a side pipe 74 branching from the main pipe 72.

A first space A adjoining the outer side of the hollow fiber membrane 22 of the hollow fiber membrane bundle 20 is formed inside the T-pipe 70.

(Hollow Fiber Membrane Module)

The hollow fiber membrane module 5 is inserted into the T-pipe 70 from the first end 72a (the insertion opening of the hollow fiber membrane module) of the main pipe 72 such that the exposed portion of the hollow fiber membrane bundle 20 is located inside the main pipe 72.

The hollow fiber membrane module 5 is installed in the T-pipe 70 in a detachable and liquid-tight manner by fitting the first coupling portion C1 of the collecting member 51 to the first end 72a of the main pipe 72 to couple it in a detachable and liquid-tight manner.

The hollow fiber membrane module 5 is installed in the gas pipe 200 in a detachable and liquid-tight manner by fitting the second coupling portion C2 of the collecting member 51 to the first end of the gas pipe 200 to coupling it in a detachable and liquid-tight manner.

(Gas Pipe)

The second end of the gas pipe 200 is coupled to the gas supply source 300.

A second space B communicating with the inside of the hollow fiber membrane 22 is formed in the gas pipe 200.

The gas pipe 200 may include a metal tube, a glass tube, a resin tube, or the like.

(Gas Supply Source)

The gas supply source 300 may include a gas reservoir (that may have a pressure regulator), a booster pump, or the like.

(Degassing Method or Gas Supplying Method)

Gas supplying for the objective liquid using the degassing and gas supplying device 104 according to the fourth embodiment may be performed in the following way.

A pressurizing/feeding pump (not illustrated) is coupled to a start end (objective liquid inlet) of the side pipe 74, or a suction pump (not illustrated) is coupled to a terminated end of the main pipe 72 (treatment liquid outlet).

The second space B inside the gas pipe 200 is compressed by actuating the gas supply source 300, so that the inside of the hollow fiber membrane 22 of the hollow fiber membrane bundle 20 communicating with the second space B is compressed.

The objective liquid is supplied from the side pipe 74 to the first space A of the main pipe 72 by actuating the pressurizing/feeding pump or the suction pump.

The objective liquid supplied to the first space A flows through the first space A along the length direction of the hollow fiber membrane 22.

The treatment liquid flowing through the first space A is discharged to the outside of the degassing and gas supplying device 104 through the main pipe 72.

While the objective liquid flows through the first space A, the objective liquid makes contact with the outer side of the hollow fiber membrane 22. The gas compressed in the inner side of the hollow fiber membrane 22 moves to the objective liquid making contact with the outer side of the hollow fiber membrane 22. As a result, gas is added or dissolved to the objective liquid.

Note that degassing for the objective liquid may be performed by connecting a gas suction source (such as a vacuum pump, a syringe, or an aspirator) instead of the gas supply source 300.

The objective liquid as a degassing or gas supplying target, the gas to be degassed, the gas to be supplied may be similar to those of the first embodiment.

(Action Mechanism)

The degassing and gas supplying device 104 according to the fourth embodiment described above has the hollow fiber membrane module 5 capable of sufficiently performing degassing or gas supplying for an objective liquid and inexpensively providing degassing or gas supplying and easily installable in the installation object. Therefore, it is possible to sufficiently perform degassing or gas supplying for the objective liquid, inexpensively provide degassing or gas supplying, and easily detachably install the hollow fiber membrane module 5.

Fifth Embodiment of Degassing and Gas Supplying Device

Figure 19:
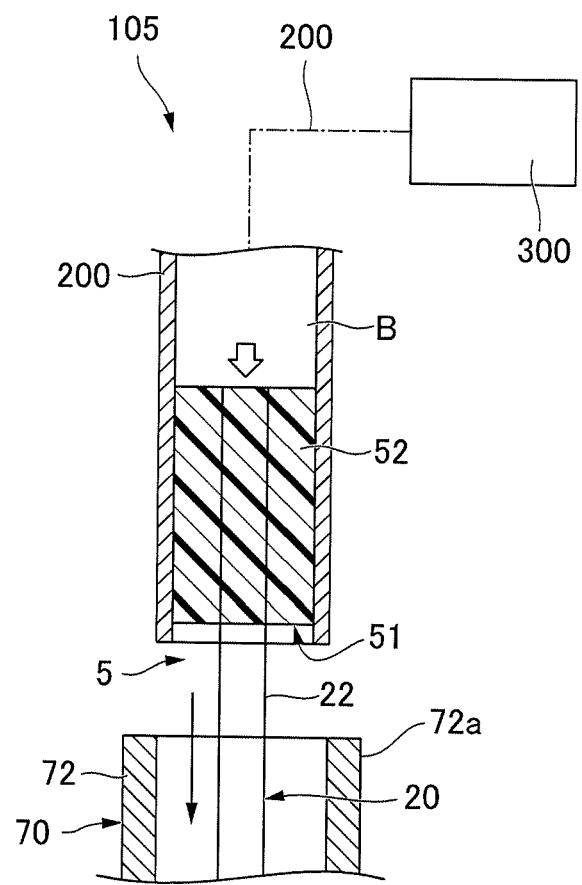
FIG. 19 is a cross-sectional view illustrating a degassing and gas supplying device according to a fifth embodiment of the invention.

FIG. 19 is a cross-sectional view illustrating a degassing and gas supplying device according to a fifth embodiment of the invention.

The degassing and gas supplying device 105 has a hollow fiber membrane module 5, a T-pipe 70 (an objective liquid piping or a branch pipe), a gas pipe 200, and a gas supply source 300.

Note that, although only one of the hollow fiber membranes 22 of the hollow fiber membrane module 5 is representatively drawn as a bold line, in practice, a plurality of hollow fiber membranes 22 are bundled.

In the following description, like reference numerals denote like elements as in the degassing and gas supplying device 104 of the fourth embodiment, and they will not be described repeatedly.

The degassing and gas supplying device 105 according to the fifth embodiment is different from the degassing and gas supplying device 104 of the fourth embodiment in the following reasons.

The first end of the gas pipe 200 is fitted to the first end 72a of the main pipe 72 while the collecting member 51 of the hollow fiber membrane module 5 is fitted to the first end of the gas pipe 200 as a whole, so that the coupling portion of the collecting member 51 is coupled to the first end 72a of the main pipe 72 using the first end of the gas pipe 200. As a result, the hollow fiber membrane module 5 is installed in the T-pipe 70 in a detachable and liquid-tight manner using the first end of the gas pipe 200.

Note that the first end of the gas pipe 200 and the first end 72a of the main pipe 72 may be coupled to each other using a pipe fitting. In addition, the first end 72a of the main pipe 72 may be fitted to the first end of the gas pipe 200 while the collecting member 51 is fitted to the first end 72a of the main pipe 72 as a whole.

Sixth Embodiment of Degassing and Gas Supplying Device

Figure 20:
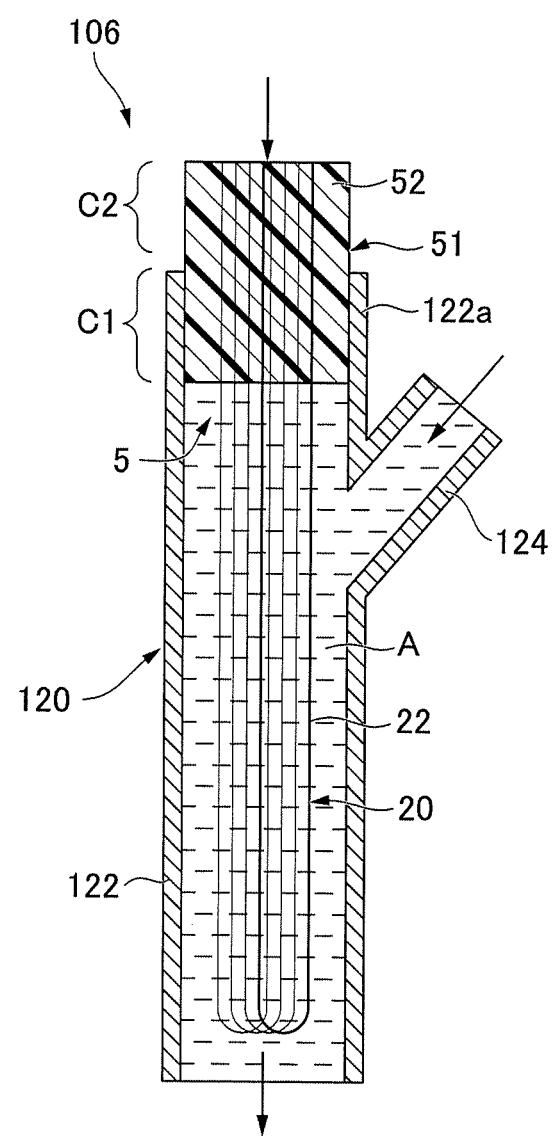
FIG. 20 is a cross-sectional view illustrating a degassing and gas supplying device according to a sixth embodiment of the invention.

FIG. 20 is a cross-sectional view illustrating a degassing and gas supplying device according to a sixth embodiment of the invention.

The degassing and gas supplying device 106 has a hollow fiber membrane module 5 and a branch pipe 120 (objective liquid piping).

Note that only one of the hollow fiber membranes 22 of the hollow fiber membrane module 5 is representatively indicated by a bold line for description purposes, and other hollow fiber membranes 22 are indicated by narrow lines.

(Branch Pipe)

The branch pipe 120 has a circular cylindrical main pipe 122 and a side pipe 124 obliquely branching from the middle of the main pipe 122.

A first space A adjoining the outer side of the hollow fiber membrane 22 of the hollow fiber membrane bundle 20 is formed inside the branch pipe 120.

(Hollow Fiber Membrane Module)

The hollow fiber membrane module 5 is inserted into the branch pipe 120 from the first end 122a (the insertion opening of the hollow fiber membrane module) of the main pipe 122 such that the exposed portion of the hollow fiber membrane bundle 20 is located inside the main pipe 122.

The hollow fiber membrane module 5 is installed in the branch pipe 120 in a detachable and liquid-tight manner by fitting the first coupling portion C1 of the collecting member 51 to the first end 122a of the main pipe 122 to couple it in a detachable and liquid-tight manner.

The hollow fiber membrane module 5 is installed in the gas pipe in a detachable and liquid-tight manner by fitting the second coupling portion C2 of the collecting member 51 to the first end of the gas pipe (not illustrated) to couple it in a detachable and liquid-tight manner.

(Degassing Method or Gas Supplying Method)

Gas supplying or degassing for the objective liquid using the degassing and gas supplying device 106 according to the sixth embodiment may be performed similar to the gas supplying or degassing for the objective liquid using the degassing and gas supplying device 104 according to the fourth embodiment, by coupling a pressurizing/feeding pump (not illustrated) to a start end (objective liquid inlet) of the side pipe 124 or coupling a suction pump (not illustrated) to a terminated end (treatment liquid outlet) of the main pipe 122.

(Action Mechanism)

The degassing and gas supplying device 106 according to the sixth embodiment described above has the hollow fiber membrane module 5 capable of sufficiently performing degassing or gas supplying for an objective liquid and inexpensively providing degassing or gas supplying and easily installable in the installation object. Therefore, it is possible to sufficiently perform degassing or gas supplying for the objective liquid, inexpensively provide degassing or gas supplying, and easily detachably install the hollow fiber membrane module 5.

Seventh Embodiment of Degassing and Gas Supplying Device

Figure 21:
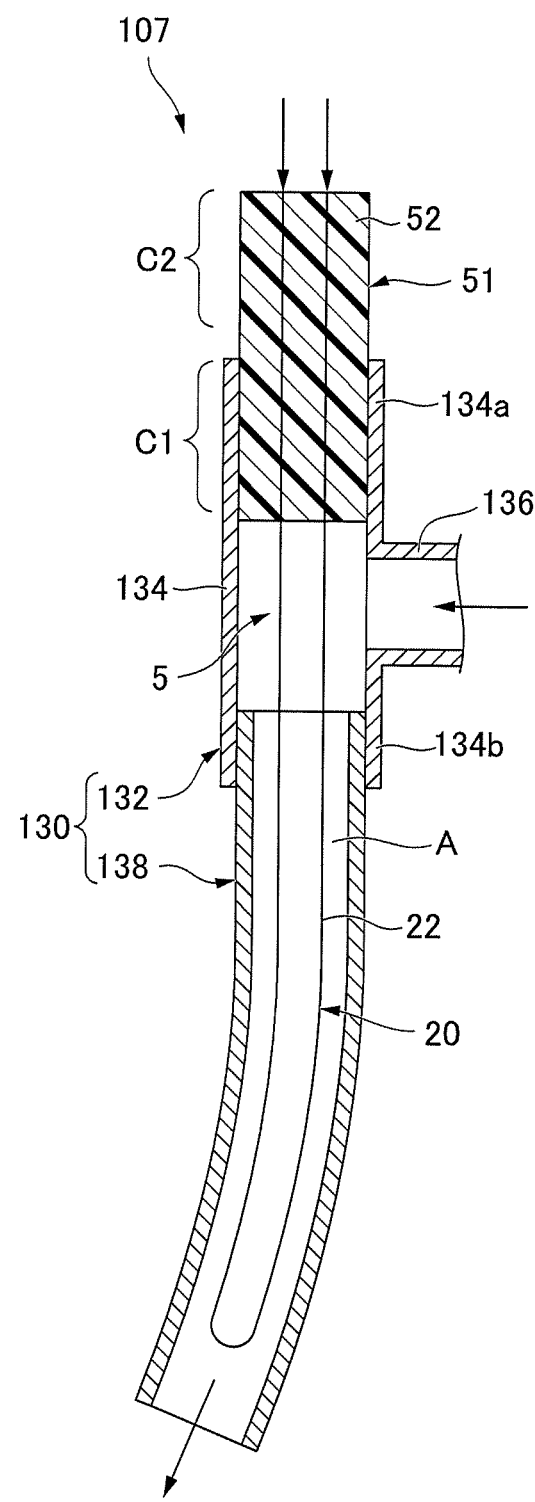
FIG. 21 is a cross-sectional view illustrating a degassing and gas supplying device according to a seventh embodiment of the invention.

FIG. 21 is a cross-sectional view illustrating a degassing and gas supplying device according to a seventh embodiment of the invention.

The degassing and gas supplying device 107 has a hollow fiber membrane module 5 and a branch pipe 130 (objective liquid piping).

Note that, although only one of the hollow fiber membranes 22 of the hollow fiber membrane module 5 is representatively drawn by a bold line for description purposes, in practice, a plurality of hollow fiber membranes 22 are bundled.

(Branch Pipe)

The branch pipe 130 has a T-shaped pipe fitting 132 having three openings and an extension pipe 138 coupled to one opening of the pipe fitting 132.

The pipe fitting 132 has a circular cylindrical main pipe 134 and a side pipe 136 branching from the middle of the main pipe 134.

The extension pipe 138 is fitted and coupled to a second end 134b of the main pipe 134 of the pipe fitting 132.

A first space A adjoining the outer side of the hollow fiber membrane 22 of the hollow fiber membrane bundle 20 is formed inside the branch pipe 130.

(Pipe Fitting)

The pipe fitting 132 may include a push-in fitting, a fastening fitting, or the like. The push-in fitting is preferable because the hollow fiber membrane module 5 can be coupled to the pipe fitting 132 with a single touch.

The push-in fitting is a pipe fitting configured such that sealed coupling between the inner surface of the pipe fitting and the outer surface of the tube can be easily accomplished simply by inserting the tube into the opening of the pipe fitting. For example, the push-in fitting may include a push-in fitting for a thermoplastic resin tube specified in JIS B 8381-1:2008 (corresponding to the international standard ISO 14743:2004) or a pipe fitting having a structure similar thereto.

The fastening fitting is a pipe fitting configured to accomplish more reliable (sealed) connection for sealing between the pipe fitting and the tube by inserting the tube into the opening of the pipe fitting and fastening a cap nut. For example, the fastening fitting may include a fastening fitting for a thermoplastic resin tube specified in JIS B 8381-2:2008, or a pipe fitting having a structure similar thereto.

The pipe fitting may be either a T-shaped pipe fitting or a Y-shaped pipe fitting. The T-shaped pipe fitting in which two openings are arranged side by side is preferable because the hollow fiber membrane bundle 20 can easily pass.

(Extension Pipe)

The length of the extension pipe 138 may be set to any length as long as the exposed portion of the hollow fiber membrane bundle 20 of the hollow fiber membrane module 5 can be inserted. The outer diameter and the thickness of the extension pipe 138 may be set by referring to the standard JIS K 6771-1995.

The extension pipe 138 may include a resin tube (formed of silicon, nylon elastomer, low density polyethylene, polyurethane, or the like), a metal tube (formed of stainless steel or the like), or the like.

(Hollow Fiber Membrane Module)

The hollow fiber membrane module 5 is inserted into the branch pipe 130 from the first end 134a (the insertion opening of the hollow fiber membrane module) of the main pipe 134 such that the exposed portion of the hollow fiber membrane bundle 20 is located inside the main pipe 134 and the extension pipe 138.

The hollow fiber membrane module 5 is installed in the branch pipe 130 in a detachable and liquid-tight manner by fitting the first coupling portion C1 of the collecting member 51 to the first end 134a of the main pipe 134 to couple it in a detachable and liquid-tight manner.

The hollow fiber membrane module 5 is installed in the gas pipe in a detachable and liquid-tight manner by fitting the second coupling portion C2 of the collecting member 51 to the first end of the gas pipe (not illustrated) to couple it in a detachable and liquid-tight manner.

(Degassing Method or Gas Supplying Method)

Gas supplying or degassing for the objective liquid using the degassing and gas supplying device 107 according to the seventh embodiment may be performed similar to the gas supplying or degassing for the objective liquid using the degassing and gas supplying device 104 according to the fourth embodiment, by coupling a pressurizing/feeding pump (not illustrated) to a start end (objective liquid inlet) of the side pipe 136 or coupling a suction pump (not illustrated) to a terminated end (treatment liquid outlet) of the extension pipe 138.

(Action Mechanism)

The degassing and gas supplying device 107 according to the seventh embodiment described above has the hollow fiber membrane module 5 capable of sufficiently performing degassing or gas supplying for an objective liquid and inexpensively providing degassing or gas supplying and easily installable in the installation object. Therefore, it is possible to sufficiently perform degassing or gas supplying for the objective liquid, inexpensively provide degassing or gas supplying, and easily detachably install the hollow fiber membrane module 5.

The degassing and gas supplying device 107 according to the seventh embodiment is advantageous in that the branch pipe 130 can be simply configured using the thin extension pipe (tube) and the pipe fitting 132 for branching. As a result, it is possible to insert the degassing and gas supplying device 107 without changing the thickness of the pipe in the middle of various pipes and perform gas supplying or degassing for the objective liquid without occupying a large space. That is, the configuration of inserting the hollow fiber membrane bundle 20 into the thin tube to perform gas supplying or degassing for the objective liquid flowing through the tube is similar to a configuration of a typical piping including tubes and pipe fittings in appearance except for existence of the gas supply source (gas suction source). In addition, the occupying space is very small, compared to a degassing and gas supplying device using a hollow fiber membrane module of the related art.

Eighth Embodiment of Degassing and Gas Supplying Device

Figure 22:
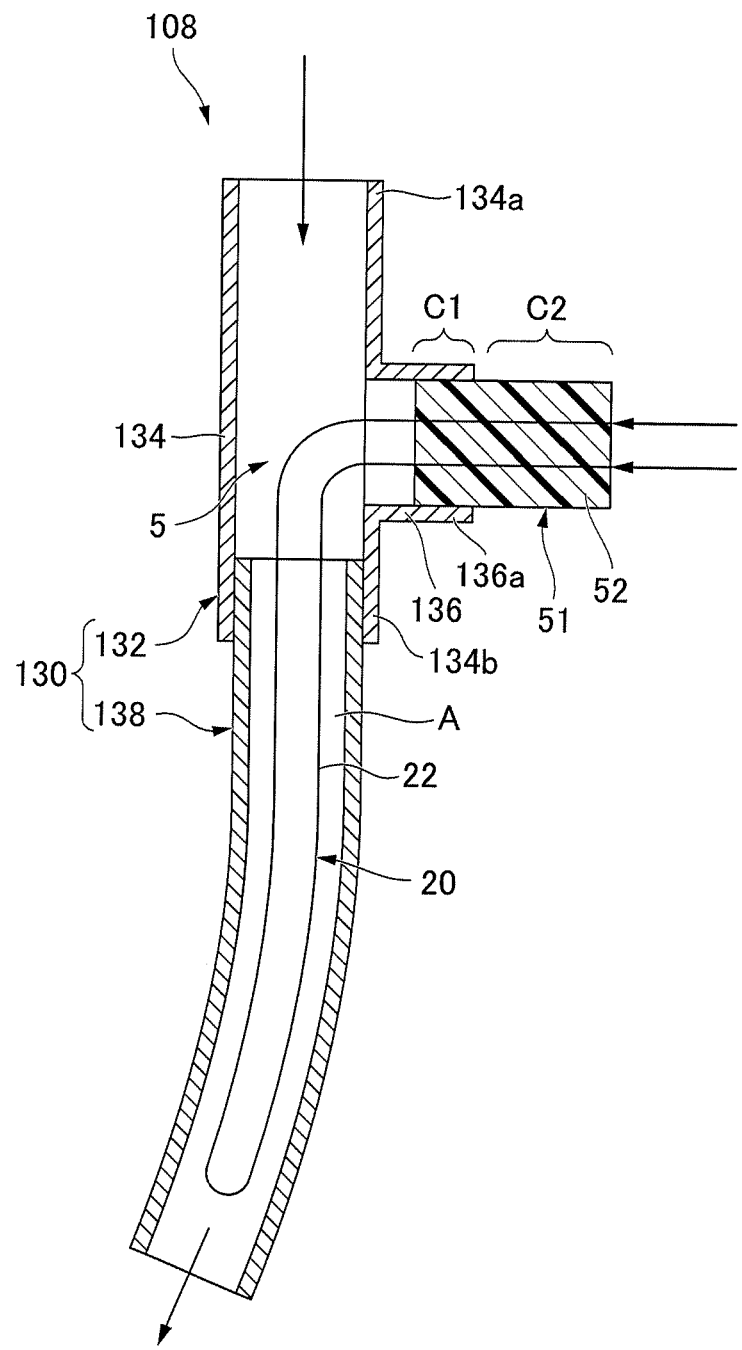
FIG. 22 is a cross-sectional view illustrating a degassing and gas supplying device according to an eighth embodiment of the invention.

FIG. 22 is a cross-sectional view illustrating a degassing and gas supplying device according to an eighth embodiment of the invention.

The degassing and gas supplying device 108 has a hollow fiber membrane module 5 and a branch pipe 130 (objective liquid piping).

Note that, although only one of the hollow fiber membranes 22 of the hollow fiber membrane module 5 is representatively drawn by a bold line, in practice, a plurality of hollow fiber membranes 22 are bundled.

In the following description, like reference numerals denote like elements as in the degassing and gas supplying device 107 of the seventh embodiment, and they will not be described repeatedly.

The degassing and gas supplying device 108 according to the eighth embodiment is different from the degassing and gas supplying device 107 of the seventh embodiment in the following reasons.

The hollow fiber membrane module 5 is inserted from an end 136*a* of the side pipe 136 (the insertion opening of the hollow fiber membrane module) into the branch pipe 130 such that the exposed portion of the hollow fiber membrane bundle 20 is located in the inner sides of the side pipe 136, a rear half of the main pipe 134, and the extension pipe 138.

(Degassing Method or Gas Supplying Method)

Gas supplying or degassing for the objective liquid using the degassing and gas supplying device 108 according to the eighth embodiment may be performed similar to the gas supplying or degassing for the objective liquid using the degassing and gas supplying device 107 according to the seventh embodiment, by coupling a pressurizing/feeding pump (not illustrated) to the first end 134*a* (objective liquid inlet) of the main pipe 134 or coupling a suction pump (not illustrated) to a terminated end (treatment liquid outlet) of the extension pipe 138.

(Action Mechanism)

The degassing and gas supplying device 108 according to the eighth embodiment described above can exhibit the same effects as those of the degassing and gas supplying device 107 of the seventh embodiment on the basis of the action mechanism similar to that of the degassing and gas supplying device 107 of the seventh embodiment.

In the degassing and gas supplying device 108 according to the eighth embodiment, openings at both ends of the main pipe 134 arranged side by side in line with each other in the pipe fitting 132 are used as an objective liquid inlet and an objective liquid outlet, and the objective liquid flows straight through the pipe fitting 132 from the inlet to the outlet. As a result, it is possible to eliminate a dead space in the flow passage of the objective liquid and reduce a risk of bacterial growth caused by liquid stagnation.

Ninth Embodiment of Degassing and Gas Supplying Device

Figure 23:
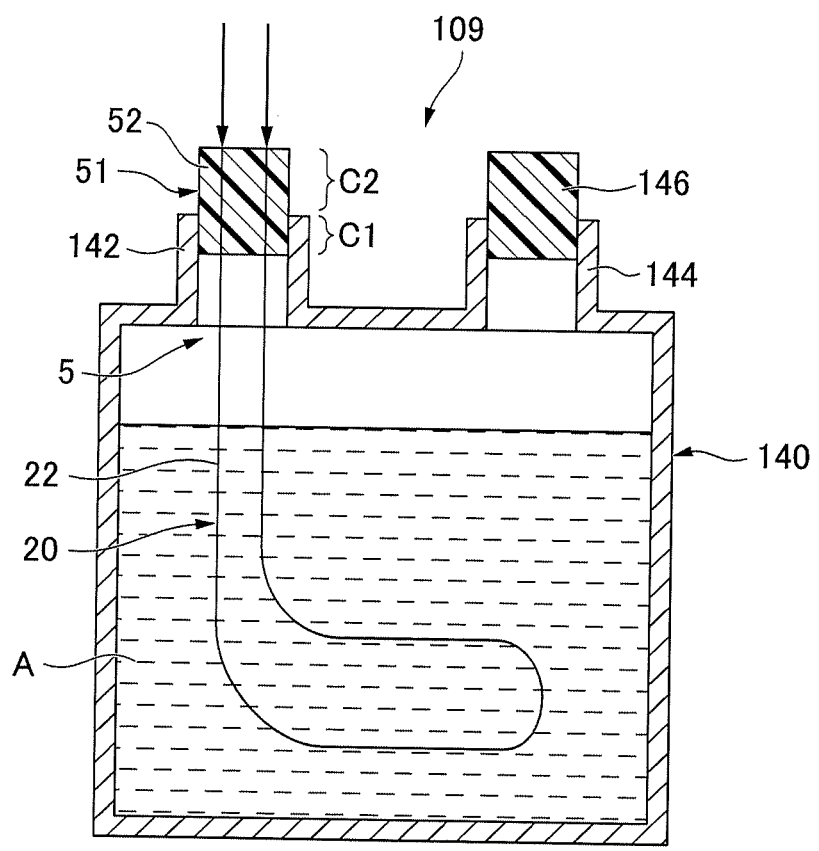
FIG. 23 is a cross-sectional view illustrating a degassing and gas supplying device according to a ninth embodiment of the invention.

FIG. 23 is a cross-sectional view illustrating a degassing and gas supplying device according to a ninth embodiment of the invention.

The degassing and gas supplying device 109 according to the ninth embodiment has a hollow fiber membrane module 5 and a container 140 (objective liquid casing).

(Container)

A first space A adjoining the outer side of the hollow fiber membrane 22 of the hollow fiber membrane bundle 20 is formed inside the container 140.

A module insertion opening 142 (the insertion opening of the hollow fiber membrane module) communicating with the first space A and having a shape matching that of the collecting member 51 (coupling portion) of the hollow fiber membrane module 5 is formed in an upper part of the container 140.

A liquid access port 144 communicating with the first space A and serving as an objective liquid inlet and a treatment liquid outlet is formed in an upper part of the container 140.

The container 140 may be a container or a tank formed of a hard material (a resin material such as polyvinyl chloride, low density polyethylene, high density polyethylene, and polypropylene, or a metal material such as stainless steel), or a flexible pouch (for example, infusion bag) formed of a flexible resin film such as polyvinyl chloride or polyethylene.

The liquid access port 144 is sealed with a plug 146 in a liquid-tight manner. A value may be provided instead of the plug 146. In addition, a tube may be inserted into the container 140 through the plug 146. The tube may be provided with a valve, a cock, or a plug.

In a case where a gas is dissolved in the objective liquid inside the container 140 using the hollow fiber membrane module 5, the inside of the container 140 is compressed as the gas is supplied to the container 140. In addition, in a case where the gas is removed from the objective liquid of the container 140 using the hollow fiber membrane module 5, the inside of the container 140 is decompressed. In this regard, the container 140 may be further provided with a safety device (such as a pressure relief value) for relieving the pressure.

The container 140 may be provided with an engagement portion (such as a tab) having a hole for hooking to an intravenous stand.

(Hollow Fiber Membrane Module)

The hollow fiber membrane module 5 is inserted into the container 140 from the module insertion opening 142 of the container 140 such that the exposed portion of the hollow fiber membrane bundle 20 is located inside the container 140.

The hollow fiber membrane module 5 is installed in the container 140 in a detachable and liquid-tight manner by fitting the first coupling portion C1 of the collecting member 51 to the module insertion opening 142 of the container 140 to couple it in a detachable and liquid-tight manner.

The hollow fiber membrane module 5 is installed in the gas pipe in a detachable and liquid-tight manner by fitting the second coupling portion C2 of the collecting member 51 to the first end of the gas pipe (not illustrated) to couple it in a detachable and liquid-tight manner.

(Degassing Method or Gas Supplying Method)

Gas supplying for the objective liquid using the degassing and gas supplying device 109 according to the ninth embodiment may be performed in the following way.

The gas supply source (not illustrated) is coupled to the second end of the gas pipe (not illustrated). The objective liquid is filled in the first space A of the container 140.

The second space B inside the gas pipe is compressed by actuating the gas supply source, so that the inside of the hollow fiber membrane 22 of the hollow fiber membrane bundle 20 communicating with the second space B is compressed.

The objective liquid filled in the first space A of the container 140 makes contact with the outer side of the hollow fiber membrane 22. The gas compressed in the inner side of the hollow fiber membrane 22 moves to the objective liquid making contact with the outer side of the hollow fiber membrane 22. As a result, the gas is added or dissolved in the objective liquid.

Note that degassing for the objective liquid may be performed by connecting a gas suction source (such as a vacuum pump, a syringe, or an aspirator) instead of the gas supply source 300.

The objective liquid as a degassing or gas supplying target, the gas to be degassed, the gas to be supplied may be similar to those of the first embodiment.

(Action Mechanism)

The degassing and gas supplying device 109 according to the ninth embodiment described above has the hollow fiber membrane module 5 capable of sufficiently performing degassing or gas supplying for an objective liquid and inexpensively providing degassing or gas supplying and easily installable in the installation object. Therefore, it is possible to sufficiently perform degassing or gas supplying for the objective liquid, inexpensively provide degassing or gas supplying, and easily detachably install the hollow fiber membrane module 5.

Other Embodiments of Degassing and Gas Supplying Device

Note that the invention is not limited to the degassing and gas supplying device according to the first to ninth embodiments in the illustrated examples as long as the degassing and gas supplying device for removing a gas from an objective liquid or supplying gas to the objective liquid includes the hollow fiber membrane module according to the invention and an objective liquid piping or an objective liquid casing installed with one or more hollow fiber membrane modules, and the collecting member is coupled to the objective liquid piping or the objective liquid casing in a detachable and liquid-tight manner directly or by using another member in the coupling portion of the collecting member while the exposed portion of the hollow fiber membrane bundle of the hollow fiber membrane module is inserted into the inside of the objective liquid piping or the objective liquid casing.

For example, the second installation means engaged with the first installation means provided in the housing of the hollow fiber membrane module and provided in the objective liquid piping or the objective liquid casing may include a bayonet type installation means without limiting to the thread and the trench.

For example, installation of the hollow fiber membrane module in the objective liquid piping or the objective liquid casing may be performed in the following way.

The end of the collecting member of the hollow fiber membrane module and the opening of the objective liquid piping or the objective liquid casing are respectively provided with a flange and are engaged with each other using a bolt or the like.

A one-touch fitting (quick coupling) known in the art is employed by setting the opening of the objective liquid piping or the objective liquid casing as a female side and setting an external shape of the collecting member of the hollow fiber membrane module as a male side so that both sides are detachably installed in a one-touch manner.

male and female tapered structures employed in coupling between a syringe and an injection needle are fitted and coupled.

In order to achieve such a configuration, a layer having a metal or resin fitting structure may be added to the outer side of the collecting member of the hollow fiber membrane module.

First Embodiment of Inkjet Printer

Figure 24:
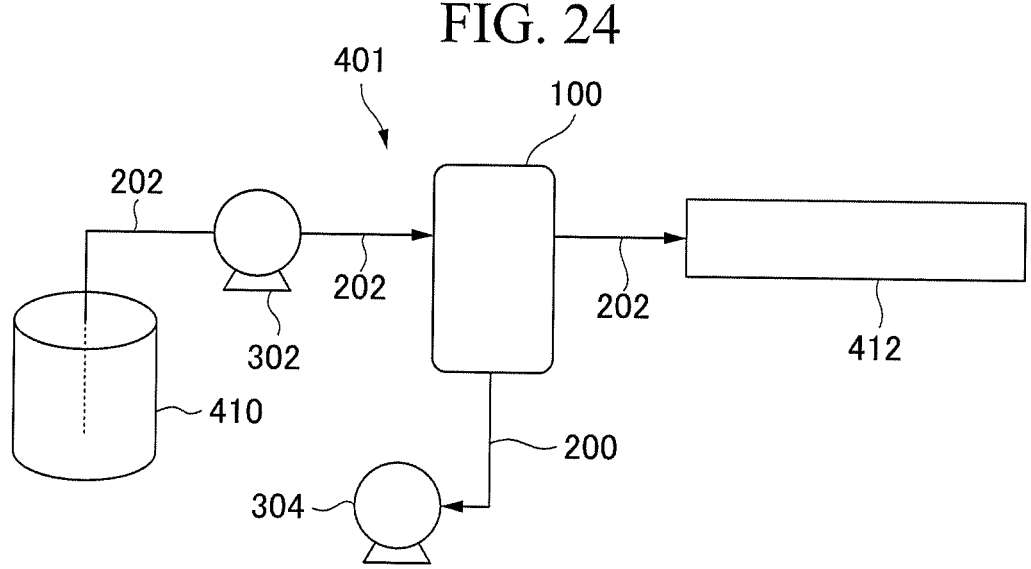
FIG. 24 is a schematic configuration diagram illustrating an inkjet printer according to a first embodiment of the invention.

FIG. 24 is a schematic configuration diagram illustrating an inkjet printer according to a first embodiment of the invention.

The inkjet printer 401 according to the first embodiment has an ink cartridge 410, a print head 412 that discharges ink, a liquid feeding pipe 202 that feeds ink from the ink cartridge 410 to the print head 412, a degassing and gas supplying device 100 provided in the middle of the liquid feeding pipe 202, a liquid feeding pump 302 provided in the middle of the liquid feeding pipe 202 between the ink cartridge 410 and the degassing and gas supplying device 100, and a vacuum pump 304 (decompressing means) coupled to the degassing and gas supplying device 100 using a gas pipe 200.

The degassing and gas supplying device 100 is a degassing and gas supplying device according to the invention. For example, any one of the degassing and gas supplying devices according to first to ninth embodiments in the illustrated examples is employed as the degassing and gas supplying device 100.

The liquid feeding pipe 202 is coupled to the objective liquid inlet and the treatment liquid outlet of the degassing and gas supplying device 100.

The gas pipe 200 is coupled to the collecting member of the hollow fiber membrane module of the degassing and gas supplying device 100.

(Degassing Method)

Degassing for the ink in the inkjet printer 401 according to the first embodiment may be performed as described below.

The second space B inside the gas pipe 200 is decompressed by actuating the vacuum pump 304, so that the inside of the hollow fiber membrane of the hollow fiber membrane bundle communicating with the second space B is decompressed.

The ink is supplied to the first space A adjoining the outer side of the hollow fiber membrane of the degassing and gas supplying device 100 by actuating the liquid feeding pump 302. In this case, the liquid feeding pump 302 may be provided between the degassing and gas supplying device 100 and the print head 412 to suction the ink and supply it to the space A.

While the ink flows through the first space A, the ink makes contact with the outer side of the hollow fiber membrane. A dissolved gas contained in the ink making contact with the outer side of the hollow fiber membrane moves from the outer side of the hollow fiber membrane to the inner side having a decompressed state. As a result, the dissolved gas is removed from the ink.

(Action Mechanism)

The inkjet printer 401 according to the first embodiment described above has the degassing and gas supplying device 100 capable of sufficiently performing degassing or gas supplying for an objective liquid, inexpensively providing degassing or gas supplying, and allowing the hollow fiber membrane module to be easily detachably installed. Therefore, it is possible to sufficiently perform degassing or gas supplying for the objective liquid, inexpensively provide degassing or gas supplying, and easily detachably install the hollow fiber membrane module.

Second Embodiment of Inkjet Printer

Figure 25:
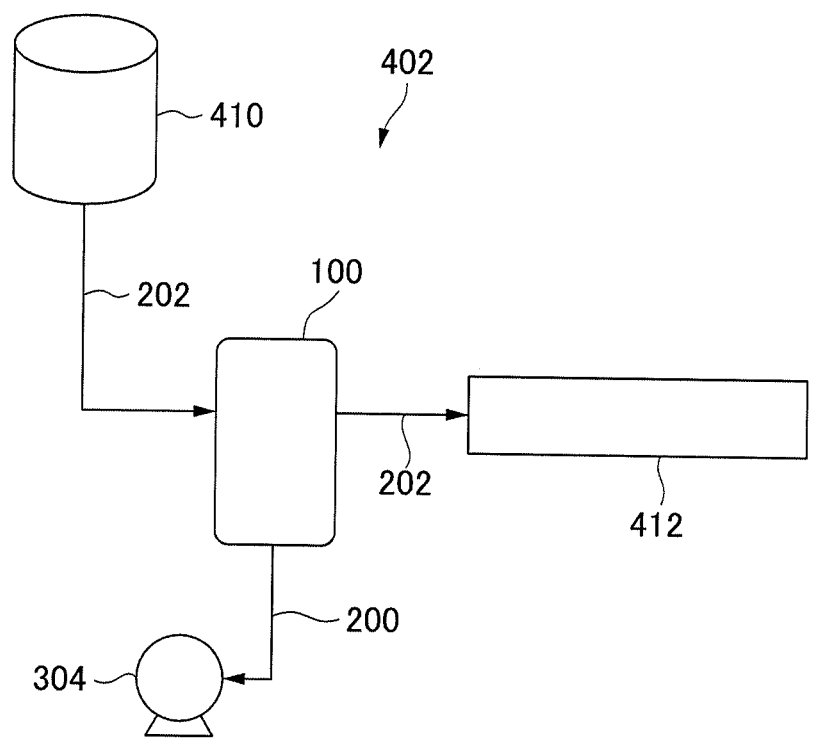
FIG. 25 is a schematic configuration diagram illustrating an inkjet printer according to a second embodiment of the invention.

FIG. 25 is a schematic diagram illustrating an inkjet printer according to a second embodiment of the invention.

The inkjet printer 402 according to the second embodiment has an ink cartridge 410, a print head 412 provided in a location lower than the ink cartridge 410 to discharges ink, a liquid feeding pipe 202 that feeds ink from the ink cartridge 410 to the print head 412, a degassing and gas supplying device 100 provided in the middle of the liquid feeding pipe 202, and a vacuum pump 304 (decompressing means) coupled to the degassing and gas supplying device 100 using the gas pipe 200.

In the following description, like reference numerals denote like elements as in the inkjet printer 401 of the first embodiment, and they will not be described repeatedly.

(Degassing Method)

Degassing for the ink in the inkjet printer 402 according to the second embodiment may be performed as described below.

The second space B inside the gas pipe 200 is decompressed by actuating the vacuum pump 304, so that the inside of the hollow fiber membrane of the hollow fiber membrane bundle communicating with the second space B is decompressed.

The ink is supplied to the first space A adjoining the outer side of the hollow fiber membrane of the degassing and gas supplying device 100 by using a height difference between the ink cartridge 410 and the print head 412.

While the ink flows through the first space A, the ink makes contact with the outer side of the hollow fiber membrane. A dissolved gas contained in the ink making contact with the outer side of the hollow fiber membrane moves from the outer side of the hollow fiber membrane to the inner side having a decompressed state. As a result, the dissolved gas is removed from the ink.

(Action Mechanism)

The inkjet printer 402 according to the second embodiment described above has the same action mechanism as that of the inkjet printer 401 of the first embodiment, and can exhibit the same effects as those of the inkjet printer 401 of the first embodiment.

First Embodiment of Device for Manufacturing Carbonated Spring

Figure 26:
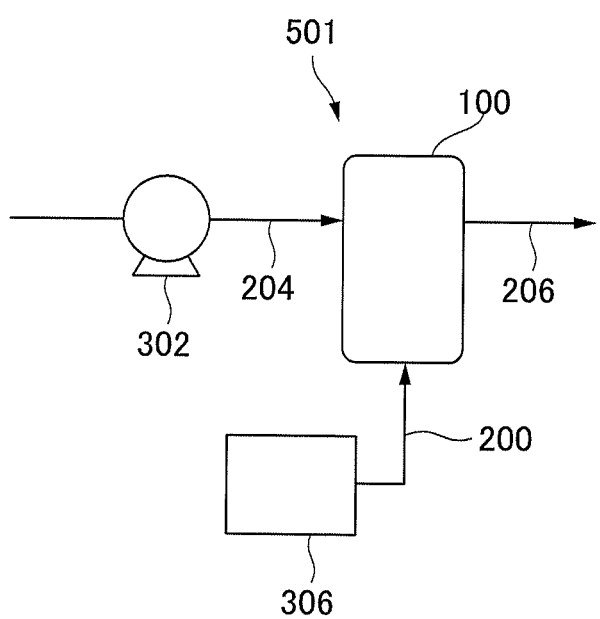
FIG. 26 is a schematic configuration diagram illustrating a device for manufacturing carbonated spring according to a first embodiment of the invention.

FIG. 26 is a schematic configuration diagram illustrating a device for manufacturing carbonated spring according to a first embodiment of the invention.

The device for manufacturing carbonated spring 501 according to the first embodiment has a degassing and gas supplying device 100, a raw water supply pipe 204 that supplies a raw water to the degassing and gas supplying device 100, a carbonated spring discharge pipe 206 that discharges a carbonated spring from the degassing and gas supplying device 100, a liquid feeding pump 302 provided in the middle of the raw water supply pipe 204, and a carbonic acid gas supply means 306 coupled to the degassing and gas supplying device 100 using the gas pipe 200. Although not illustrated in FIG. 26, a raw water tank may be provided in front of the liquid feeding pump 302, or a tank may be provided in rear of the degassing and gas supplying device 100.

The degassing and gas supplying device 100 is the degassing and gas supplying device according to the invention. As the degassing and gas supplying device 100, for example, any one of the degassing and gas supplying devices according to the first to ninth embodiments in the illustrated examples is employed.

The raw water supply pipe 204 is coupled to the objective liquid inlet of the degassing and gas supplying device 100.

The carbonated spring discharge pipe 206 is coupled to the treatment liquid outlet of the degassing and gas supplying device 100.

The gas pipe 200 is coupled to the collecting member of the hollow fiber membrane module of the degassing and gas supplying device 100.

The carbonic acid gas supply means 306 may include a carbonic acid gas reservoir or the like.

(Gas Supplying Method)

Gas supplying for raw water in the device for manufacturing carbonated spring 501 according to the first embodiment may be performed in the following way.

The second space B inside the gas pipe 200 is compressed by actuating the carbonic acid gas supply means 306, so that the inside of the hollow fiber membrane of the hollow fiber membrane bundle communicating with the second space B is compressed.

Raw water is supplied to the first space A adjoining the outer side of the hollow fiber membrane in the degassing and gas supplying device 100 by actuating the liquid feeding pump 302.

While the raw water flows through the first space A, the raw water makes contact with the outer side of the hollow fiber membrane. The carbonic acid gas having a compressed state in the inner side of the hollow fiber membrane moves to the raw water making contact with the outer side of the hollow fiber membrane. As a result, the raw water is dissolved to the carbonic acid gas to obtain a carbonated spring (carbonated water).

Among the gas dissolved liquids, the carbonated water obtained by dissolving the carbonic acid gas in water is a useful gas dissolved solution having an effect of reducing a pulse rate and diastolic blood pressure, an effect of improving a heart reflux of venous blood and increasing a stroke volume, skin congestion, and a respiration amount by bathing as described in the Pharmacopoeia of Japan. A concentration of the carbonic acid gas in the carbonated water is set to, for example, approximately 1000 ppm at a temperature of 37° C.

(Action Mechanism)

The device for manufacturing carbonated spring 501 according to the first embodiment described above has the degassing and gas supplying device 100 capable of sufficiently performing degassing or gas supplying for an objective liquid, inexpensively providing degassing or gas supplying, and allowing the hollow fiber membrane module to easily detachably installed. Therefore, it is possible to sufficiently perform degassing or gas supplying for the objective liquid, inexpensively provide degassing or gas supplying, and easily detachably install the hollow fiber membrane module.

INDUSTRIAL APPLICABILITY

The hollow fiber membrane module according to the invention is useful as a hollow fiber membrane module used in removal of the dissolved gas from the liquid (degassing) or supplying of gas to liquid (gas supplying).

EXPLANATIONS OF LETTERS OR NUMERALS

1 HOLLOW FIBER MEMBRANE MODULE
2 HOLLOW FIBER MEMBRANE MODULE
3 HOLLOW FIBER MEMBRANE MODULE
4 HOLLOW FIBER MEMBRANE MODULE
5 HOLLOW FIBER MEMBRANE MODULE
6 HOLLOW FIBER MEMBRANE MODULE
7 HOLLOW FIBER MEMBRANE MODULE
8 HOLLOW FIBER MEMBRANE MODULE
9 HOLLOW FIBER MEMBRANE MODULE
10 HOLLOW FIBER MEMBRANE MODULE
11 HOLLOW FIBER MEMBRANE MODULE
12 HOLLOW FIBER MEMBRANE MODULE
20 HOLLOW FIBER MEMBRANE BUNDLE
20' HOLLOW FIBER MEMBRANE BUNDLE
20*a* FIRST END
20*b* SECOND END
22 HOLLOW FIBER MEMBRANE
22*a* OPENED END PORTION
22*b* BENT PORTION
24 CONSTRAINING YARN
26 CONSTRAINING RESIN
30 HOUSING
30' HOUSING
30*a* GAS ACCESS PORT
32 HOUSING BODY
32' HOUSING BODY
32*a* HOUSING BODY UPPER PART
32*b* HOUSING BODY LOWER PART
34 FLANGE PORTION
36 GAS ACCESS NOZZLE
38 THREAD
39 HOSE FITTING
40 FIXING PORTION
42 O-RING
44 SEAL MEMBER
46 SEALANT LAYER
47 O-RING
48 RESIN LAYER
49 PIPE FITTING
49*a* LARGE-DIAMETER PORTION
49*b* SMALL-DIAMETER PORTION
50 COLLECTING MEMBER
50' COLLECTING MEMBER
51 COLLECTING MEMBER
52 COLLECTING RESIN
53 COLLECTING MEMBER
54 COLLECTING MEMBER
55 COLLECTING MEMBER
56 COLLECTING MEMBER
57 COLLECTING MEMBER
58 COLLECTING MEMBER
60 T-PIPE
62 MAIN PIPE
62*a* FIRST END
64 SIDE PIPE
70 T-PIPE
72 MAIN PIPE
72*a* FIRST END
74 SIDE PIPE
80 CASING
80*a* OBJECTIVE LIQUID INLET
80*b* TREATMENT LIQUID OUTLET
82 CASING BODY
84 PARTITION PLATE
86 MODULE FIXING PORTION
86*a* MODULE INSERTION OPENING
86*b* TRENCH
88 OBJECTIVE LIQUID INLET NOZZLE
89 TREATMENT LIQUID OUTLET NOZZLE
90 CASING
90*a* OBJECTIVE LIQUID INLET
90*b* TREATMENT LIQUID OUTLET
92 CASING BODY
94 CASING OPENINGS
94*a* TRENCH
96 OBJECTIVE LIQUID INLET NOZZLE
98 TREATMENT LIQUID OUTLET NOZZLE
100 DEGASSING AND GAS SUPPLYING DEVICE
101 DEGASSING AND GAS SUPPLYING DEVICE
102 DEGASSING AND GAS SUPPLYING DEVICE
103 DEGASSING AND GAS SUPPLYING DEVICE
104 DEGASSING AND GAS SUPPLYING DEVICE
105 DEGASSING AND GAS SUPPLYING DEVICE
106 DEGASSING AND GAS SUPPLYING DEVICE
107 DEGASSING AND GAS SUPPLYING DEVICE
108 DEGASSING AND GAS SUPPLYING DEVICE
109 DEGASSING AND GAS SUPPLYING DEVICE
120 BRANCH PIPE
122 MAIN PIPE
122*a* FIRST END
124 SIDE PIPE
130 BRANCH PIPE
132 PIPE FITTING
134 MAIN PIPE
134*a* FIRST END
134*b* SECOND END
136 SIDE PIPE
136*a* END
138 EXTENSION PIPE
140 CONTAINER
142 MODULE INSERTION OPENING
144 LIQUID ACCESS PORT
146 PLUG
200 GAS PIPE
202 LIQUID FEEDING PIPE
204 RAW WATER SUPPLY PIPE
206 CARBONATED SPRING DISCHARGE PIPE
300 GAS SUPPLY SOURCE
302 LIQUID FEEDING PUMP
304 VACUUM PUMP
306 CARBONIC ACID GAS SUPPLY MEANS
401 INKJET PRINTER

402 INKJET PRINTER
410 INK CARTRIDGE
412 PRINT HEAD
501 DEVICE FOR MANUFACTURING CARBONATED SPRING
A FIRST SPACE
B SECOND SPACE
C1 FIRST COUPLING PORTION
C2 SECOND COUPLING PORTION

The invention claimed is:

1. A hollow fiber membrane module for removing gas from an objective liquid or supplying gas to the objective liquid, comprising:
   a hollow fiber membrane bundle; and
   a collecting member configured to collect first ends of the hollow fiber membrane bundle while maintaining openings of opened end portions of hollow fiber membranes of the hollow fiber membrane bundle,
   wherein the collecting member comprises a housing body that houses only the first ends and its vicinity of the hollow fiber membrane bundle, and
   wherein the housing body is a part of a coupling portion configured to couple the collecting member to an installation object in a detachable and liquid-tight manner.

2. The hollow fiber membrane module according to claim 1, wherein the coupling portion has an outer shape fittable to an opening of the installation object.

3. The hollow fiber membrane module according to claim 2, wherein the coupling portion has a circular cylindrical shape, and
   the installation object is a pipe fitting.

4. The hollow fiber membrane module according to claim 1, wherein the collecting member further comprises a fixing portion that fixes the first ends of the hollow fiber membrane bundle to the housing body in a liquid-tight manner while maintaining an opening of an opened end portion of the hollow fiber membrane, and
   a part of the housing body corresponding to the coupling portion has an installation means for coupling the collecting member to the installation object in a detachable and liquid-tight manner.

5. The hollow fiber membrane module according to claim 4, wherein the installation means is a seal member.

6. The hollow fiber membrane module according to claim 4, wherein the installation means is a thread.

7. The hollow fiber membrane module according to claim 1, wherein a second end of the hollow fiber membrane bundle is a free end.

8. The hollow fiber membrane module according to claim 1, wherein the hollow fiber membrane bundle is bent in a U-shape, and locations of bent portions of the hollow fiber membranes of the hollow fiber membrane bundle are aligned to substantially match each other.

9. A degassing and gas supplying device for removing gas from an objective liquid and supplying gas to the objective liquid, comprising:
   the hollow fiber membrane module according to claim 1; and
   an objective liquid piping or an objective liquid casing installed with one or more hollow fiber membrane modules,
   wherein the collecting member of the coupling portion is coupled to the objective liquid piping or the objective liquid casing directly or by using another member in a detachable and liquid-tight manner while an exposed portion of the hollow fiber membrane bundle of the hollow fiber membrane module is inserted into the objective liquid piping or the objective liquid casing.

10. The degassing and gas supplying device according to claim 9, wherein the collecting member is coupled to the objective liquid piping or the objective liquid casing in a detachable and liquid-tight manner by fitting the coupling portion to an opening of the objective liquid piping or the objective liquid casing.

11. The degassing and gas supplying device according to claim 9, wherein the objective liquid piping is a branch pipe having an insertion opening of the hollow fiber membrane module, an objective liquid inlet, and a treatment liquid outlet.

12. The degassing and gas supplying device according to claim 11, wherein the branch pipe has a pipe fitting having at least three openings and an extension pipe coupled to one opening of the pipe fitting,
   at least one of a plurality openings of the pipe fitting opening other than that where the extension pipe is coupled is an insertion opening of the hollow fiber membrane module, and
   a part of the exposed portion of the hollow fiber membrane bundle of the hollow fiber membrane module is placed in the inside of the extension pipe.

13. The degassing and gas supplying device according to claim 9, wherein the objective liquid casing is a container having an insertion opening of the hollow fiber membrane module and a liquid access port serving as an objective liquid inlet and a treatment liquid outlet.

14. The degassing and gas supplying device according to claim 9, wherein a coupling portion in the exposed portion side of the hollow fiber membrane bundle out of coupling portions of the collecting member is coupled to the objective liquid piping or the objective liquid casing, and a coupling portion opposite to the exposed portion side of the hollow fiber membrane bundle is coupled to a gas pipe that discharges gas from the hollow fiber membrane module or supplies gas to the hollow fiber membrane module.

15. The degassing and gas supplying device according to claim 9, wherein the collecting member has further comprises a fixing portion that fixes the first ends of the hollow fiber membrane bundle to the housing body in a liquid-tight manner while maintaining an opening of an opened end portion of the hollow fiber membrane,
   a part of the housing body corresponding to the coupling portion has a first installation means for coupling the collecting member to the objective liquid piping or the objective liquid casing in a detachable and liquid-tight manner,
   the objective liquid piping or the objective liquid casing is provided with a second installation means corresponding to the first installation means, and
   the hollow fiber membrane module is installed in the objective liquid piping or the objective liquid casing in a detachable and liquid-tight manner using the first installation means and the second installation means.

16. The degassing and gas supplying device according to claim 15, wherein the first installation means is a seal member, and the second installation means is a trench mated with the seal member.

17. The degassing and gas supplying device according to claim 15, wherein the first installation means and the second installation means are threads.

18. The degassing and gas supplying device according to claim 15, wherein the first installation means and the second installation means are bayonet types.

19. An inkjet printer, comprising:
one or more ink cartridges;
a print head configured to discharge ink;
a liquid feeding pipe configured to feed the ink from the ink cartridge to the print head;
the degassing and gas supplying device according to claim 9 provided in the middle of the liquid feeding pipe; and
a decompressing means coupled to the degassing and gas supplying device using a gas pipe.

20. A device for manufacturing a carbonated water, comprising:
the degassing and gas supplying device according to claim 9;
a raw water supply pipe configured to supply raw water to the degassing and gas supplying device;
a carbonated water discharge pipe configured to discharge a carbonated water from the degassing and gas supplying device; and
a carbonic acid gas supply means coupled to the degassing and gas supplying device using a gas pipe.

21. A degassing and gas supplying device for removing gas from an objective liquid and supplying gas to the objective liquid, comprising:
a hollow fiber membrane module comprising a hollow fiber membrane bundle; and a collecting member configured to collect first ends of the hollow fiber membrane bundle while maintaining openings of opened end portions of hollow fiber membranes of the hollow fiber membrane bundle,
wherein the collecting member has a coupling portion configured to couple the collecting member to an installation object in a detachable and liquid-tight manner; and
an objective liquid piping or an objective liquid casing installed with one or more hollow fiber membrane modules,
wherein the objective liquid piping is a branch pipe having an insertion opening of the hollow fiber membrane module, an objective liquid inlet, and a treatment liquid outlet and,
wherein the branch pipe has a pipe fitting having at least three openings and an extension pipe coupled to one opening of the pipe fitting,
at least one of a plurality openings of the pipe fitting opening other than that where the extension pipe is coupled is an insertion opening of the hollow fiber membrane module, and
a part of the exposed portion of the hollow fiber membrane bundle of the hollow fiber membrane module is placed in the inside of the extension pipe,
wherein the collecting member of the coupling portion is coupled to the objective liquid piping or the objective liquid casing directly or by using another member in a detachable and liquid-tight manner while an exposed portion of the hollow fiber membrane bundle of the hollow fiber membrane module is inserted into the objective liquid piping or the objective liquid casing.

22. The degassing and gas supplying device according to claim 21, wherein the collecting member is coupled to the objective liquid piping or the objective liquid casing in a detachable and liquid-tight manner by fitting the coupling portion to an opening of the objective liquid piping or the objective liquid casing.

23. The degassing and gas supplying device according to claim 21, wherein the objective liquid casing is a container having an insertion opening of the hollow fiber membrane module and a liquid access port serving as an objective liquid inlet and a treatment liquid outlet.

24. The degassing and gas supplying device according to claim 21, wherein a coupling portion in the exposed portion side of the hollow fiber membrane bundle out of coupling portions of the collecting member is coupled to the objective liquid piping or the objective liquid casing, and a coupling portion opposite to the exposed portion side of the hollow fiber membrane bundle is coupled to a gas pipe that discharges gas from the hollow fiber membrane module or supplies gas to the hollow fiber membrane module.

25. The degassing and gas supplying device according to claim 21, wherein the collecting member further comprises a fixing portion that fixes the first ends of the hollow fiber membrane bundle to the housing body in a liquid-tight manner while maintaining an opening of an opened end portion of the hollow fiber membrane,
a part of the housing body corresponding to the coupling portion has a first installation means for coupling the collecting member to the objective liquid piping or the objective liquid casing in a detachable and liquid-tight manner,
the objective liquid piping or the objective liquid casing is provided with a second installation means corresponding to the first installation means, and
the hollow fiber membrane module is installed in the objective liquid piping or the objective liquid casing in a detachable and liquid-tight manner using the first installation means and the second installation means.

26. The degassing and gas supplying device according to claim 25, wherein the first installation means is a seal member, and the second installation means is a trench mated with the seal member.

27. The degassing and gas supplying device according to claim 25, wherein the first installation means and the second installation means are threads.

28. The degassing and gas supplying device according to claim 25, wherein the first installation means and the second installation means are bayonet types.

29. An inkjet printer, comprising:
one or more ink cartridges;
a print head configured to discharge ink;
a liquid feeding pipe configured to feed the ink from the ink cartridge to the print head;
the degassing and gas supplying device according to claim 21 provided in the middle of the liquid feeding pipe; and
a decompressing means coupled to the degassing and gas supplying device using a gas pipe.

30. A device for manufacturing a carbonated water, comprising:
the degassing and gas supplying device according to claim 21;
a raw water supply pipe configured to supply raw water to the degassing and gas supplying device;
a carbonated water discharge pipe configured to discharge a carbonated water from the degassing and gas supplying device; and
a carbonic acid gas supply means coupled to the degassing and gas supplying device using a gas pipe.

* * * * *